United States Patent
Cheng et al.

(10) Patent No.: US 12,301,403 B2
(45) Date of Patent: *May 13, 2025

(54) IDENTIFYING ROOT CAUSE OF FAILURES THROUGH DETECTION OF NETWORK SCOPE FAILURES

(71) Applicant: Juniper Networks, Inc., Sunnyvale, CA (US)

(72) Inventors: Jing Cheng, San Jose, CA (US); Jisheng Wang, Palo Alto, CA (US); Kush Shah, Santa Clara, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/527,471

(22) Filed: Dec. 4, 2023

(65) Prior Publication Data
US 2024/0097969 A1 Mar. 21, 2024

Related U.S. Application Data

(63) Continuation of application No. 17/446,601, filed on Aug. 31, 2021, now Pat. No. 11,838,172.

(51) Int. Cl.
*H04L 41/0631* (2022.01)
*H04W 24/04* (2009.01)

(52) U.S. Cl.
CPC ......... *H04L 41/0631* (2013.01); *H04W 24/04* (2013.01)

(58) Field of Classification Search
CPC ... H04L 41/0631; H04L 41/16; H04L 41/142; H04W 24/04
See application file for complete search history.

(56) References Cited

U.S. PATENT DOCUMENTS

| | | | |
|---|---|---|---|
| 6,604,208 B1 * | 8/2003 | Gosselin | H04Q 3/0075 714/48 |
| 6,728,205 B1 | 4/2004 | Finn et al. | |

(Continued)

FOREIGN PATENT DOCUMENTS

| | | |
|---|---|---|
| CN | 112104495 A | 12/2020 |
| EP | 3211831 A1 | 8/2017 |

OTHER PUBLICATIONS

Extended Search Report from counterpart European Application No. 22192047.3 dated Jan. 20, 2023, 9 pp.

(Continued)

*Primary Examiner* — Tejis Daya
(74) *Attorney, Agent, or Firm* — Shumaker & Sieffert, P.A.

(57) ABSTRACT

Techniques are described by which a network management system (NMS) is configured to provide identification of root cause failure through the detection of network scope failures. For example, the NMS comprises one or more processors; and a memory comprising instructions that when executed by the one or more processors cause the one or more processors to: generate a hierarchical attribution graph comprising attributes representing different network scopes at different hierarchical levels; receive network event data, wherein the network event data is indicative of operational behavior of the network, including one or more of successful events or one or more failure events associated with one or more client devices; and apply a machine learning model to the network event data and to a particular network scope in the hierarchical attribution graph to detect whether the particular network scope has failure.

18 Claims, 12 Drawing Sheets

(56) References Cited

U.S. PATENT DOCUMENTS

| | | | |
|---|---|---|---|
| 7,028,228 B1* | 4/2006 | Lovy | H04L 43/10 |
| | | | 714/57 |
| 8,661,295 B1 | 2/2014 | Khanna et al. | |
| 9,413,597 B2* | 8/2016 | Bishop | H04L 41/0618 |
| 9,729,439 B2 | 8/2017 | MeLampy et al. | |
| 9,729,682 B2 | 8/2017 | Kumar et al. | |
| 9,762,485 B2 | 9/2017 | Kaplan et al. | |
| 9,832,082 B2 | 11/2017 | Dade et al. | |
| 9,871,748 B2 | 1/2018 | Gosselin et al. | |
| 9,985,883 B2 | 5/2018 | MeLampy et al. | |
| 10,200,264 B2 | 2/2019 | Menon et al. | |
| 10,277,506 B2 | 4/2019 | Timmons et al. | |
| 10,432,522 B2 | 10/2019 | Kaplan et al. | |
| 10,756,983 B2 | 8/2020 | Ratkovic et al. | |
| 10,771,434 B1 | 9/2020 | Srinath et al. | |
| 10,862,742 B2 | 12/2020 | Singh | |
| 10,958,537 B2 | 3/2021 | Safavi | |
| 10,958,585 B2 | 3/2021 | Safavi | |
| 10,985,969 B2 | 4/2021 | Safavi et al. | |
| 10,992,543 B1 | 4/2021 | Rachamadugu et al. | |
| 10,999,182 B2 | 5/2021 | Kaplan et al. | |
| 11,075,824 B2 | 7/2021 | McCulley et al. | |
| 11,153,202 B2 | 10/2021 | Kaplan et al. | |
| 11,165,863 B1 | 11/2021 | Timmons et al. | |
| 11,206,185 B2 | 12/2021 | Sarood et al. | |
| 11,329,912 B2 | 5/2022 | Kaplan et al. | |
| 11,451,464 B2 | 9/2022 | Kaplan et al. | |
| 11,570,038 B2 | 1/2023 | Wang et al. | |
| 11,743,151 B2 | 8/2023 | Safavi | |
| 11,838,172 B2 | 12/2023 | Cheng et al. | |
| 2001/0013107 A1 | 8/2001 | Lewis | |
| 2006/0095815 A1 | 5/2006 | Noy et al. | |
| 2008/0201462 A1 | 8/2008 | Liss et al. | |
| 2010/0063871 A1 | 3/2010 | Merrifield, Jr. | |
| 2010/0172251 A1* | 7/2010 | Adam | H04W 4/02 |
| | | | 370/252 |
| 2013/0051248 A1* | 2/2013 | Pei | H04L 41/0618 |
| | | | 370/245 |
| 2014/0129876 A1 | 5/2014 | Addepalli et al. | |
| 2014/0379895 A1* | 12/2014 | Jain | H04L 41/0654 |
| | | | 709/224 |
| 2015/0254969 A1 | 9/2015 | Bishop et al. | |
| 2016/0112350 A1 | 4/2016 | Morrison et al. | |
| 2018/0191563 A1 | 7/2018 | Farmanbar et al. | |
| 2018/0308001 A1 | 10/2018 | Doddala et al. | |
| 2019/0156225 A1* | 5/2019 | Agarini | G06F 7/02 |
| 2020/0136890 A1 | 4/2020 | To et al. | |
| 2020/0213236 A1 | 7/2020 | Safavi | |
| 2020/0259746 A1 | 8/2020 | Thubert et al. | |
| 2020/0366589 A1 | 11/2020 | Kaplan et al. | |
| 2020/0366590 A1 | 11/2020 | Kaplan et al. | |
| 2020/0366598 A1 | 11/2020 | Kaplan et al. | |
| 2020/0366599 A1 | 11/2020 | Kaplan et al. | |
| 2020/0374182 A1 | 11/2020 | Kolodner | |
| 2020/0403855 A1 | 12/2020 | Sarood | |
| 2020/0403890 A1 | 12/2020 | McCulley et al. | |
| 2022/0116334 A1 | 4/2022 | Zhu et al. | |
| 2022/0337495 A1 | 10/2022 | Safavi | |
| 2022/0393981 A1 | 12/2022 | Solanki et al. | |
| 2023/0011452 A1 | 1/2023 | Barber | |
| 2023/0118718 A1 | 4/2023 | Solanki et al. | |

OTHER PUBLICATIONS

Prosecution History from U.S. Appl. No. 17/446,601, now issued U.S. Pat. No. 11,838,172, dated Mar. 23, 2023 through Oct. 24, 2023, 31 pp.

Response to Extended Search Report dated Jan. 20, 2023, from counterpart European Application No. 22192047.3 filed Sep. 1, 2023, 27 pp.

U.S. Appl. No. 18/063,591, filed Dec. 8, 2022, naming inventors Pillay et al.

* cited by examiner

IDENTIFYING ROOT CAUSE OF FAILURES THROUGH DETECTION OF NETWORK SCOPE FAILURES

This application is a continuation of U.S. patent application Ser. No. 17/446,601, filed 31 Aug. 2021, the entire contents of which is incorporated herein by reference.

TECHNICAL FIELD

The disclosure relates generally to computer networks and, more specifically, to machine learning-based diagnostics of computer networks and network systems.

BACKGROUND

Commercial premises, such as offices, hospitals, airports, stadiums, or retail outlets, often include a network of wireless access points (APs) installed throughout the premises to provide wireless network services to one or more wireless devices. APs enable other devices to wirelessly connect to a wired network using various wireless networking protocols and technologies, such as wireless local area networking protocols conforming to one or more of the IEEE 802.11 standards (i.e., "WiFi"), Bluetooth/Bluetooth Low Energy (BLE), mesh networking protocols such as ZigBee or other wireless networking technologies. Many different types of wireless client devices, such as laptop computers, smartphones, tablets, wearable devices, appliances, and Internet of Things (IoT) devices, incorporate wireless communication technology and can be configured to connect to wireless access points when the device is in range of a compatible wireless access point in order to access a wired network.

Wireless access networks, and computer networks in general, are complex systems which may experience transient and/or permanent issues. Some of the issues may result in noticeable system performance degradation while other issues may resolve themselves without substantially affecting the system level performance as perceived by the users. Some issues may be expected and accepted under a heavy load and as soon as the load subsides, self-healing mechanisms, such as a retry, etc. may cause the issue to go away.

SUMMARY

In general, this disclosure describes techniques for identifying root cause of failures through the detection of network scope failures. In some examples, one or more organizations, such as enterprises, may each have different network scopes. For example, a given organization may include (i.e., "contain") one or more servers and/or one or more sites. Each server may be accessible by one or more wireless local area networks (WLANs) and each site may include one or more access point (AP) devices configured to provide a WLAN for client devices. Client devices may connect to an AP device to access a WLAN provided by the AP device within a site of an organization. In this example, the different network scopes of a given organization includes one or more servers, one or more sites, one or more wireless networks, one or more AP devices, and/or one or more client devices. Other organizations may have different network scopes.

Network failures may occur at different network scopes. In some instances, a client device may fail to connect to the AP device to access a WLAN and the failure is attributed to the client device. In other instances, each client device that is connected to an AP device may fail to access the WLAN and the failure is attributed to the AP device. In some instances, a server may fail and client devices accessing the WLAN, e.g., via multiple APs, may fail to access the server, and thus the failure is attributed to the server. As some of the issues may not resolve themselves without substantially affecting the system level performance as perceived by the users, a network management system (NMS) that manages the network may, in accordance with the techniques described in this disclosure, identify the root cause of the network failures through the detection of network scope failure.

As one example, a NMS may apply machine learning techniques to identify the root cause of error conditions detected or predicted from deductions made from client failures. For example, the NMS may apply machine learning techniques on a hierarchical attribution graph and network event data associated with client devices to perform deductions on network scope failures. The hierarchical attribution graph may include a graph of the relationship of attributes of the network, such as the containment of attributes and cross-links between attributes. As described above, each organization of a plurality of organizations may "contain" one or more servers and one or more sites, a server may "contain" one or more WLANs, and a site may "contain" one or more AP devices. These containment relationships are provided in the hierarchical attribution graph. A client device may access a WLAN by connecting to an AP device, and the relationship between the WLAN and AP device is referred to herein as a "cross-link." The cross-links between attributes may include, for example, WLAN and AP device (e.g., "WLAN+AP"), WLAN and site (e.g., "WLAN+SITE"), and server and site ("SERVER+SITE). These cross-link relationships are also provided in the hierarchical attribution graph.

The NMS may apply machine learning techniques to the hierarchical attribution graph and network event data associated with client devices to detect network scope failures. For example, the NMS may first determine, based on client device successful network events and/or client device failure network events, whether client devices have failed to access the network. The NMS may then determine whether the client failure is to be attributed to a higher scope level, e.g., a particular WLAN and particular AP device (e.g., "WLAN+AP") associated with the client device. If the NMS determines that the failure is attributed to the particular WLAN and particular AP device, the NMS may then determine whether the failure is attributed solely to the particular WLAN or to the particular AP device. Each of the network scopes is evaluated to detect whether the failure is to be attributed to a particular network scope. Based on the detection of network scope failure, the NMS may identify a root cause of the network failure, which may then be used to invoke an action (e.g., provide a notification or perform a remedial action).

The techniques described in this disclosure may provide one or more technical advantages and practical applications. For example, by applying the network scope failure detection techniques described in this disclosure, the NMS may more accurately determine the root-cause of the failure without needing to collect metrics (e.g., service level experience (SLE) metrics) over a duration of time, calculate probabilities of network failures, and make predictions based on the probabilities, which is more computationally intensive and wastes resources. Moreover, by applying the techniques described in this disclosure, the NMS may determine root cause of failures based on client device failures, which is more accurate than collecting metrics and calculating probabilities of network failures based on the collected metrics.

In one example, the disclosure is directed to network management system that manages a plurality of network devices in a network, the network management system comprising: one or more processors; and a memory comprising instructions that when executed by the one or more processors cause the one or more processors to: generate a hierarchical attribution graph, wherein the hierarchical attribution graph comprises attributes representing different network scopes at different hierarchical levels; receive network event data from the plurality of network devices, wherein the network event data is indicative of operational behavior of the network, including one or more of successful events associated with one or more client devices connected to the network or one or more failure events associated with one or more client devices connected to the network; and apply a machine learning model to the network event data and to a particular network scope in the hierarchical attribution graph to detect whether the particular network scope has failure.

In another example, the disclosure is directed to a method comprising: generating, by one or more processors of a network management system that manages a plurality of network devices in a network, a hierarchical attribution graph, wherein the hierarchical attribution graph comprises attributes representing different network scopes at different hierarchical levels; receiving, by the network management system, network event data from the plurality of network devices, wherein the network event data is indicative of operational behavior of the network, including one or more of successful events associated with one or more client devices within the network or one or more failure events associated with one or more client devices within the network; and applying, by the network management system, a machine learning model to the network event data and to a particular network scope in the hierarchical attribution graph to detect whether the particular network scope has failure.

In another example, the disclosure is directed to a non-transitory computer-readable storage medium comprising instructions that, when executed, configure processing circuitry to: generate a hierarchical attribution graph, wherein the hierarchical attribution graph comprises attributes representing different network scopes at different hierarchical levels; receive network event data from a plurality of network devices within a network, wherein the network event data is indicative of operational behavior of the network, including one or more of successful events associated with one or more client devices within the network or one or more failure events associated with one or more client devices within the network; and apply a machine learning model to the network event data and to a particular network scope in the hierarchical attribution graph to detect whether the particular network scope has failure.

The details of one or more examples of the techniques of this disclosure are set forth in the accompanying drawings and the description below. Other features, objects, and advantages of the techniques will be apparent from the description and drawings, and from the claims.

DETAILED DESCRIPTION

Figure 1A:
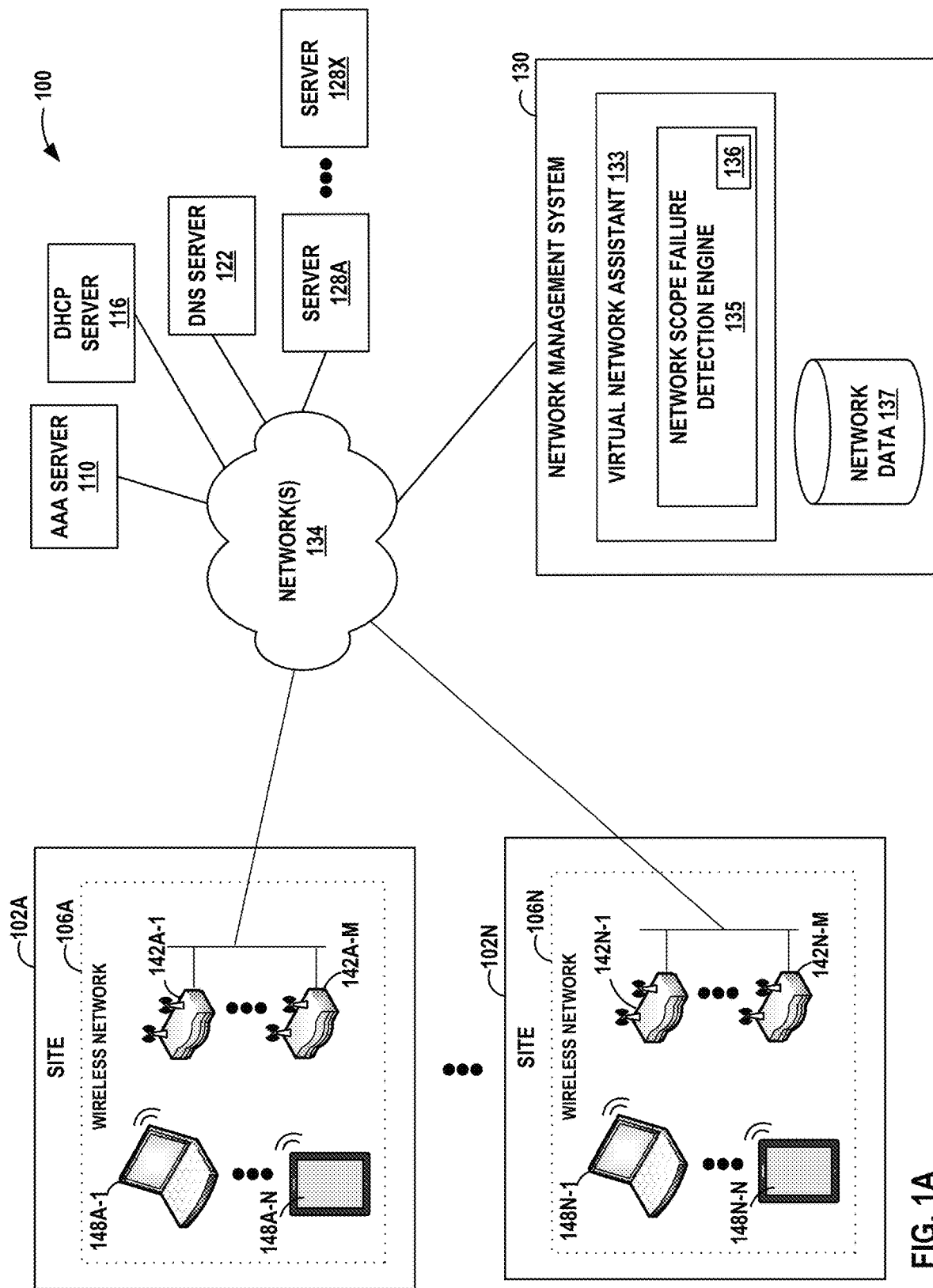
FIG. 1A is a block diagram of an example network system providing the detection of network scope failures, in accordance with one or more techniques of the disclosure.

FIG. 1A is a diagram of an example network system 100 providing a root cause analysis of error conditions through the detection of network scope failures. Example network system 100, such as a network system for an organization or enterprise, includes a plurality sites 102A-102N at which a network service provider manages one or more wireless networks 106A-106N, respectively. Although in FIG. 1A each site 102A-102N is shown as including a single wireless network 106A-106N, respectively, in some examples, each site 102A-102N may include multiple wireless networks, and the disclosure is not limited in this respect.

Sites 102, such as offices, hospitals, airports, stadiums, or retail outlets, often install complex wireless network systems, including a network of wireless access point (AP) devices, e.g., AP devices 142, throughout the premises to provide wireless network services to one or more wireless client devices. In this example, site 102A includes a plurality of AP devices 142A-1 through 142A-M. Similarly, site 102N includes a plurality of AP devices 142N-1 through 142N-M. Each AP device 142 may be any type of wireless access point, including, but not limited to, a commercial or enterprise access point, a router, or any other device capable of providing wireless network access. Although the example of FIG. 1A is described with respect to wireless network systems, the techniques described in this disclosure may apply to wired network systems and/or wireless network systems.

Each site 102A-102N also includes a plurality of client devices, otherwise known as user equipment devices (UEs), referred to generally as client devices 148 or UEs 148, representing various wireless-enabled devices within each site. For example, a plurality of UEs 148A-1 through 148A-N are currently located at site 102A. Similarly, a plurality of UEs 148N-1 through 148N-N are currently located at site 102N. Each UE 148 may be any type of wireless client device, including, but not limited to, a mobile device such as a smartphone, tablet or laptop computer, a personal digital assistant (PDA), a wireless terminal, a smart watch, smart ring or other wearable device. UEs 148 may also include IoT client devices such as printers, security devices, environmental sensors, appliances, or any other device configured to communicate over one or more wireless networks.

Example network system 100 also includes various networking components for providing networking services within the wired network including, as examples, an Authentication, Authorization and Accounting (AAA) server 110 for authenticating users and/or UEs 148, a Dynamic Host Configuration Protocol (DHCP) server 116 for dynamically assigning network addresses (e.g., IP addresses) to UEs 148 upon authentication, a Domain Name System (DNS) server 122 for resolving domain names into network addresses, a plurality of servers 128 (e.g., web servers, databases servers, file servers and the like), and a network management system (NMS) 130. As shown in FIG. 1A, the various devices and systems of network 100 are coupled together via one or more network(s) 134, e.g., the Internet and/or an enterprise intranet. Each one of the servers 110, 116, 122 and/or 128, AP devices 142, UEs 148, NMS 130, and any other servers or devices attached to or forming part of network system 100 may include a system log or an error log module wherein each one of these devices records the status of the device including normal operational status and error conditions.

In the example of FIG. 1A, NMS 130 is a cloud-based computing platform that manages wireless networks 106A-106N at one or more of sites 102A-102N. As further described herein, NMS 130 provides an integrated suite of wireless network management tools and implements various techniques of the disclosure.

NMS 130 monitors network data associated with wireless networks 106A-106N at each site 102A-102N, respectively, to deliver a high-quality wireless network experience to end users, IoT devices and clients at the site. The network data may be stored in a database, such as database 137 within NMS 130 or, alternatively, in an external database. In general, NMS 130 may provide a cloud-based platform for network data acquisition, monitoring, activity logging, reporting, predictive analytics, network anomaly identification, and alert generation.

NMS 130 observes, collects and/or receives network data 137 for a variety of client devices, such as SDK clients, named assets, and/or client devices connected/unconnected to the wireless network. The network data is indicative of one or more aspects of wireless network performance. Network data 137 may take the form of data extracted from messages, counters and statistics, for example. The network data may be collected and/or measured by one or more UEs 148 and/or one or more AP devices 142 in a wireless network 106. Some of the network data 137 may be collected and/or measured by other devices in the network system 100. In accordance with one specific implementation, a computing device is part of the network management server 130. In accordance with other implementations, NMS 130 may comprise one or more computing devices, dedicated servers, virtual machines, containers, services or other forms of environments for performing the techniques described herein.

NMS 130 may include a virtual network assistant (VNA) 133 that analyzes network data received from one or more UEs 148 and/or one or more AP devices 142 in a wireless network, provides real-time insights and simplified troubleshooting for IT operations, and automatically takes remedial action or provides recommendations to proactively address wireless network issues. VNA 133 may, for example, include a network data processing platform configured to process hundreds or thousands of concurrent streams of network data from UEs 148, sensors and/or agents associated with AP devices 142 and/or nodes within network 134. For example, VNA 133 of NMS 130 may include a network performance engine that automatically determines one or more service level experience (SLE) metrics for each client device 148 in a wireless network 106. SLE metrics determined based on the collected network data can be used to measure various aspects of wireless network performance. SLE metrics seek to measure and understand network performance from the viewpoint of the end user experience on the network. One example SLE metric is a coverage metric, which tracks the number of user minutes that a client device's received signal strength indicator (RSSI) as measured by the client and conveyed via an access point with which the UE is associated is below a configurable threshold. Another example SLE metric is a roaming metric, which tracks a client's percentage of successful roams between two access points that are within prescribed latency (e.g., time-based) thresholds. Other example SLE metrics may include time to connect, throughput, successful connects, capacity, AP health, and/or any other metric that may be indicative of one or more aspects of wireless network performance. The SLE metrics may also include parameters such as a received signal strength indicator (RSSI) of a received wireless signal as measured by the client device, a signal-to-noise ratio (SNR) of the wireless signal as measured by the client device, etc. The thresholds may be customized and configured by the wireless network service provider to define service level expectations at the site. The network service provider may further implement systems that automatically identify the root cause(s) of any SLE metrics that do not satisfy the thresholds, and/or that automatically implement one or more remedial actions to address the root cause, thus automatically improving wireless network performance.

VNA 133 may also include an underlying analytics and network error identification engine and alerting system. VNA 133 may further provide real-time alerting and reporting to notify administrators or IT personnel of any predicted events, anomalies, trends, and may perform root cause analysis and automated or assisted error remediation.

In some examples, VNA 133 of NMS 130 may apply machine learning techniques to detect network scope failure and identify the root cause of error conditions detected from the streams of event data. VNA 133 may generate a notification indicative of the root cause and/or one or more remedial actions that may be taken to address the root cause of the error conditions. In some examples, if the root cause may be automatically resolved, VNA 133 invokes one or more remedial or mitigating actions to address the root cause of the error condition, thus automatically improving the underlying wireless network performance and also automatically improving the user experience of the wireless network.

Computational resources and components implementing VNA 133 may be part of the NMS 130, may execute on other servers or execution environments, or may be distributed to nodes within network 134 (e.g., routers, switches, controllers, gateways and the like). Example details of these and other operations implemented by the VNA 133 and/or NMS 130 are described in U.S. application Ser. No. 14/788, 489, filed Jun. 30, 2015, and entitled "Monitoring Wireless Access Point Events," U.S. application Ser. No. 16/835,757, filed Mar. 31, 2020, and entitled "Network System Fault Resolution Using a Machine Learning Model," U.S. application Ser. No. 16/279,243, filed Feb. 19, 2019, and entitled "Systems and Methods for a Virtual Network Assistant," U.S. application Ser. No. 16/237,677, filed Dec. 31, 2018, and entitled "Methods and Apparatus for Facilitating Fault Detection and/or Predictive Fault Detection," U.S. application Ser. No. 16/251,942, filed Jan. 18, 2019, and entitled "Method for Spatio-Temporal Modeling," U.S. application Ser. No. 16/296,902, filed Mar. 8, 2019, and entitled "Method for Conveying AP Error Codes Over BLE Advertisements," and U.S. application Ser. No. 17/303,222, filed May 24, 2021, and entitled, "Virtual Network Assistant Having Proactive Analytics and Correlation Engine Using Unsupervised ML Model," all of which are incorporated herein by reference in their entirety.

In accordance with the techniques described in this disclosure, VNA 133 may include a network scope failure detection engine 135 to identify the root cause of failures through the detection of network scope failures. For example, network system 100 may include different network scopes. Network system 100 may include one or more organizations, such as the organization shown in FIG. 1 that includes a plurality of sites, e.g., sites 102A-102N, and each site may include a plurality of AP devices, e.g., AP devices 142, that provide client devices with wireless networks 106 to access one or more servers, e.g., servers 110, 116, 122, 128A-128X. That is, network system 100 may have network scopes including a plurality of organizations, an organization, one or more servers, one or more sites, one or more WLANs, one or more AP devices, and one or more client devices.

To detect failures within the various network scopes, network scope failure detection engine 135 may generate a hierarchical attribution graph of the relationship of network scopes of the network. Each network scope may be represented by an attribute of the hierarchical attribution graph. In the example of FIG. 1A, network scope failure detection engine 135 may generate a hierarchical attribution graph 136 including attribute containment relationships and attribute cross-link relationships. Further examples of the hierarchical attribution graph 136 including attribute containment relationships and attribute cross-link relationships is described in further detail in FIG. 6 below.

Attribute containment relationships may represent the relationship of an attribute included (i.e., "contained") in another attribute. In this example, the organization may include (i.e., "contain") a plurality of servers and/or a plurality of sites. The network scope failure detection engine 135 may generate hierarchical attribution graph 136 including an organization attribute at the highest hierarchy level connected to a plurality of server attributes (representing servers 110, 116, 122, 128A-128X) and the plurality of site attributes (representing sites 102) on the next hierarchy level to represent the relationship that the organization contains the plurality of servers and plurality of sites.

A server may be accessible by one or more WLANs, and therefore each of the server attributes within hierarchical attribution graph 136 may connect to one or more WLAN attributes (representing wireless networks 106) on the next hierarchy level to represent the relationship that a particular server contains one or more WLANs. Similarly, each site may include one or more AP devices, and therefore each of the site attributes within hierarchical attribution graph 136 may connect to one or more AP device attributes (representing AP devices 142) on the next hierarchy level to represent the relationship that the particular site contains one or more AP devices.

Attribute cross-link relationships may represent the cross-link relationship between different attributes. In some examples, a particular AP device may provide one or more wireless networks and alternatively, or additionally, a plurality of AP devices may provide a particular wireless network. For example, AP device 142A-1 may provide one or more wireless networks, e.g., wireless network 106A and other wireless networks in site 102A (not shown). Alternatively, or additionally, AP devices 142A-1 through 142A-N may provide wireless network 106A. Therefore, in this example, a cross-link relationship exists between AP devices 142 and wireless networks 106. Other cross-link relationships may exist, such as between servers and sites, and/or wireless networks and sites.

In accordance with the techniques described in this disclosure, network scope failure detection engine 135 may generate hierarchical attribution graph 136 including combined attributes, each representing a cross-link relationship. For example, the hierarchical attribution graph 136 may include a combined attribute of "WLAN+AP" to represent the cross-link relationship between a particular wireless network (e.g., wireless network 106A) and a particular AP device (e.g., AP device 142A-1). Similarly, the hierarchical attribution graph 136 may include a combined attribute of "WLAN+SITE" to represent the cross-link relationship between a particular wireless network (e.g., wireless network 106A) and a particular site (e.g., site 102A). Likewise, the hierarchical attribution graph 136 may include a combined attribute of "SERVER+SITE" to represent the cross-link relationship between a particular server (e.g., server 128A) and a particular site (e.g., site 102A). Network scope failure detection engine 135 may connect each attribute to the combined attribute on the next hierarchy level. For example, the hierarchical attribution graph 136 includes a server attribute representing server 128A and site attribute representing site 102A, and each of the attributes connected to the combined attribute of "SERVER+SITE" on the next hierarchy level. Similarly, the hierarchical attribution graph 136 includes a WLAN attribute representing wireless network 106A and the "SERVER+SITE" attribute, each connected to the combined attribute of "WLAN+SITE." Likewise, the hierarchical attribution graph 136 includes an AP device attribute representing AP device 142A-1 and "WLAN+SITE" attribute, each connected to the combined attribute of "WLAN+AP."

Network scope failure detection engine 135 may apply machine learning techniques to the hierarchical attribution graph 136 to detect network scope failures based on streams of network event data. Assume for example in FIG. 1A that AP device 142A-1 provides, in addition to wireless network 106A, other wireless networks, e.g., wireless networks 106B-106E (not shown in FIG. 1A). In this example, the hierarchical attribution graph 136 may include an AP device attribute representing AP device 142A-1 connected to combined attributes of wireless network 106A and AP device 142A-1, wireless network 106B and AP device 142A-1, wireless network 106C and AP device 142A-1, wireless network 106D and AP device 142A-1, and wireless network 106E and AP device 142A-1, respectively, and each of the combined attributes connected to one or more client devices connected to AP device 142A-1. An example of the hierarchical attribution graph 136 of the above example is further described in FIG. 7A below.

Network scope failure detection engine 135 may obtain client device events, such as successful network events and failure network events. Successful network events may include client authentication success (e.g., Opportunistic Key Caching (OKC) for seamless roaming, 802.11R), client authentication association success (OKC, 802.11R), client authentication re-association success (e.g., OKC, 802.11R), client domain name system (DNS) success, client reassociation, client gateway address resolution protocol (APR) success, client IP assignment success. Failure network events may include client association failure, client authentication failure (e.g., OKC, 802.11R), repeated client authorization failures, etc.

Network scope failure detection engine 135 may determine, based on the failure network events of the client device and the hierarchical attribution graph 136, the root cause of failure through the detection of network scope failures. For example, network scope failure detection engine 135 may evaluate the failure network events with respect to each network scope (e.g., node) of the hierarchical attribution graph 136 to detect network scope failures, alternatively or additionally, network scope failure detection engine 135 may evaluate the failure network events with respect to each node of the hierarchical attribution graph 136 to identify the root cause of the failure. Additional details regarding the network scope failure detection processes are described in FIGS. 7A and 7B below.

In some examples, network scope failure engine 135 may optimize the network scope failure detection process. As further described in FIG. 9 below, network scope failure detection engine 135 may filter out neutral events, attributes with less than a particular number of failure events, e.g., three (X<3) failure network events, and other information to reduce the amount of data from which network scope failure engine 135 is to analyze and process.

Figure 1B:
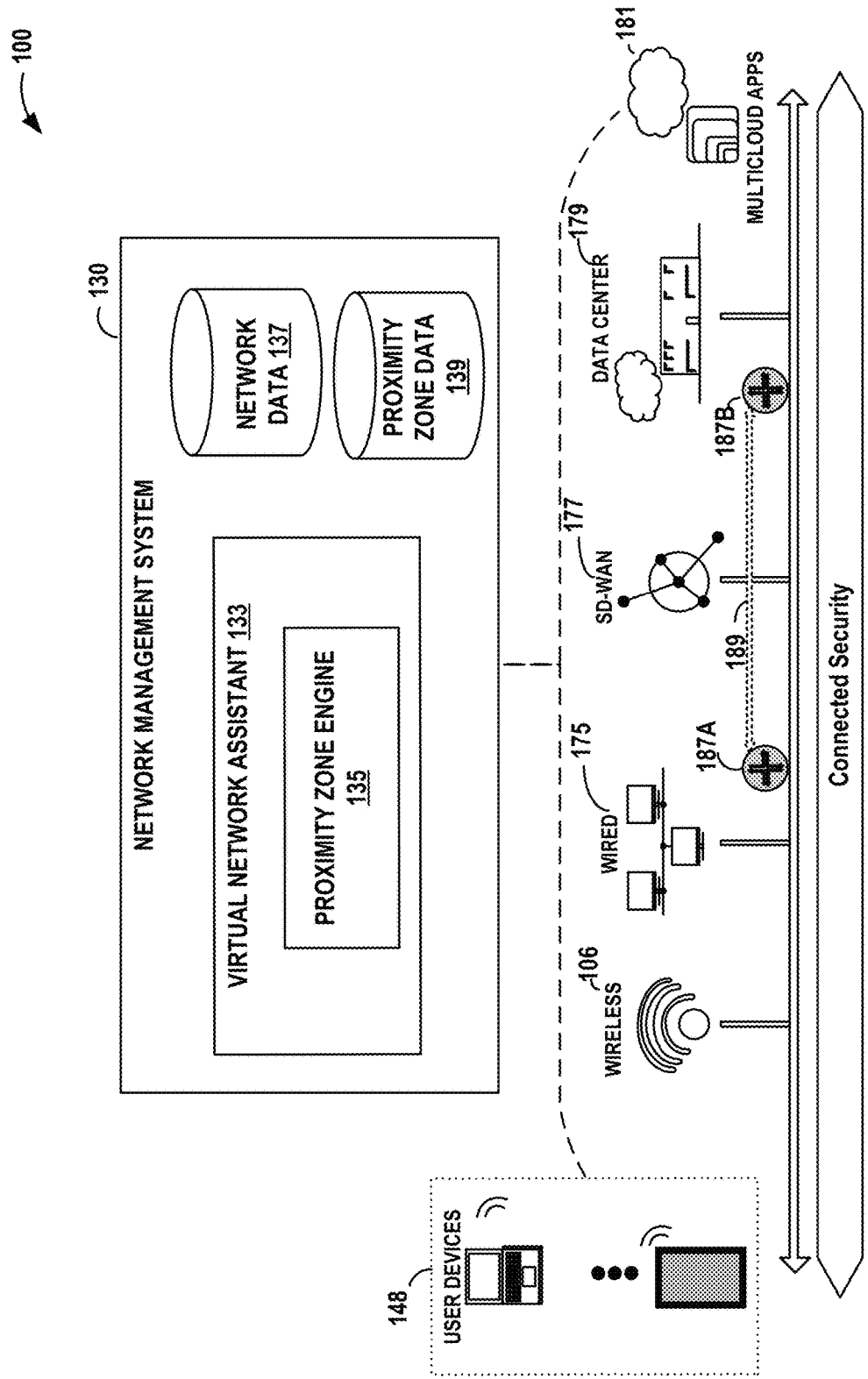
FIG. 1B is a block diagram illustrating further example details of the network system of FIG. 1A.

FIG. 1B is a block diagram illustrating further example details of the network system of FIG. 1A. In this example, FIG. 1B illustrates NMS 130 configured to operate according to an artificial intelligence/machine-learning-based computing platform providing comprehensive automation, insight, and assurance (WiFi Assurance, Wired Assurance and WAN assurance) spanning from wireless network 106 and wired LAN 175 networks at the network edge (far left of FIG. 1B) to cloud-based application services 181 hosted by computing resources within data centers 179 (far right of FIG. 1B).

As described herein, NMS 130 provides an integrated suite of management tools and implements various techniques of this disclosure. In general, NMS 130 may provide a cloud-based platform for wireless network data acquisition, monitoring, activity logging, reporting, predictive analytics, network anomaly identification, and alert generation. For example, network management system 130 may be configured to proactively monitor and adaptively configure network 100 so as to provide self-driving capabilities. Moreover, VNA 133 includes a natural language processing engine to provide AI-driven support and troubleshooting, anomaly detection, AI-driven location services, and AI-drive RF optimization with reinforcement learning.

As illustrated in the example of FIG. 1B, AI-driven NMS 130 also provides configuration management, monitoring and automated oversight of software defined wide-area network (SD-WAN) 177, which operates as an intermediate network communicatively coupling wireless networks 106 and wired LANs 175 to data centers 179 and application services 181. In general, SD-WAN 177 provides seamless, secure, traffic-engineered connectivity between "spoke" routers 187A of edge wired networks 175 hosting wireless networks 106, such as branch or campus networks, to "hub" routers 187B further up the cloud stack toward cloud-based application services 181. SD-WAN 177 often operates and manages an overlay network on an underlying physical Wide-Area Network (WAN), which provides connectivity to geographically separate customer networks. In other words, SD-WAN 177 extends Software-Defined Networking (SDN) capabilities to a WAN and allows network(s) to decouple underlying physical network infrastructure from virtualized network infrastructure and applications such that the networks may be configured and managed in a flexible and scalable manner.

In some examples, underlying routers of SD-WAN 177 may implement a stateful, session-based routing scheme in which the routers 187A, 187B dynamically modify contents of original packet headers sourced by user devices 148 to steer traffic along selected paths, e.g., path 189, toward application services 181 without requiring use of tunnels and/or additional labels. In this way, routers 177A, 177B may be more efficient and scalable for large networks since the use of tunnel-less, session-based routing may enable routers 177A, 177B to achieve considerable network resources by obviating the need to perform encapsulation and decapsulation at tunnel endpoints. Moreover, in some examples, each router 177A, 177B may independently perform path selection and traffic engineering to control packet flows associated with each session without requiring use of a centralized SDN controller for path selection and label distribution. In some examples, routers 177A, 177B implement session-based routing as Secure Vector Routing (SVR), provided by Juniper Networks, Inc.

Additional information with respect to session-based routing and SVR is described in U.S. Pat. No. 9,729,439, entitled "COMPUTER NETWORK PACKET FLOW CONTROLLER," and issued on Aug. 8, 2017; U.S. Pat. No. 9,729,682, entitled "NETWORK DEVICE AND METHOD FOR PROCESSING A SESSION USING A PACKET SIGNATURE," and issued on Aug. 8, 2017; U.S. Pat. No. 9,762,485, entitled "NETWORK PACKET FLOW CONTROLLER WITH EXTENDED SESSION MANAGEMENT," and issued on Sep. 12, 2017; U.S. Pat. No. 9,871,748, entitled "ROUTER WITH OPTIMIZED STATISTICAL FUNCTIONALITY," and issued on Jan. 16, 2018; U.S. Pat. No. 9,985,883, entitled "NAME-BASED ROUTING SYSTEM AND METHOD," and issued on May 29, 2018; U.S. Pat. No. 10,200,264, entitled "LINK STATUS MONITORING BASED ON PACKET LOSS DETECTION," and issued on Feb. 5, 2019; U.S. Pat. No. 10,277,506, entitled "STATEFUL LOAD BALANCING IN A STATELESS NETWORK," and issued on Apr. 30, 2019; U.S. Pat. No. 10,432,522, entitled "NETWORK PACKET FLOW CONTROLLER WITH EXTENDED SESSION MANAGEMENT," and issued on Oct. 1, 2019; and U.S. Patent Application Publication No. 2020/0403890, entitled "IN-LINE PERFORMANCE MONITORING," published on Dec. 24, 2020, the entire content of each of which is incorporated herein by reference in its entirety.

In some examples, AI-driven NMS 130 may enable intent-based configuration and management of network system 100, including enabling construction, presentation, and execution of intent-driven workflows for configuring and managing devices associated with wireless networks 106, wired LAN networks 175, and/or SD-WAN 177. For example, declarative requirements express a desired configuration of network components without specifying an exact native device configuration and control flow. By utilizing declarative requirements, what should be accomplished may be specified rather than how it should be accomplished. Declarative requirements may be contrasted with imperative instructions that describe the exact device configuration syntax and control flow to achieve the configuration. By utilizing declarative requirements rather than imperative instructions, a user and/or user system is relieved of the burden of determining the exact device configurations required to achieve a desired result of the user/system. For example, it is often difficult and burdensome to specify and manage exact imperative instructions to configure each device of a network when various different types of devices from different vendors are utilized. The types and kinds of devices of the network may dynamically change as new devices are added and device failures occur. Managing various different types of devices from different vendors with different configuration protocols, syntax, and software versions to configure a cohesive network of devices is often difficult to achieve. Thus, by only requiring a user/system to specify declarative requirements that specify a desired result applicable across various different types of devices, management and configuration of the network devices becomes more efficient. Further example details and techniques of an intent-based network management system are described in U.S. Pat. No. 10,756,983, entitled "Intent-based Analytics," and U.S. Pat. No. 10,992,543, entitled "Automatically generating an intent-based network model of an existing computer network," each of which is hereby incorporated by reference.

Figure 2:
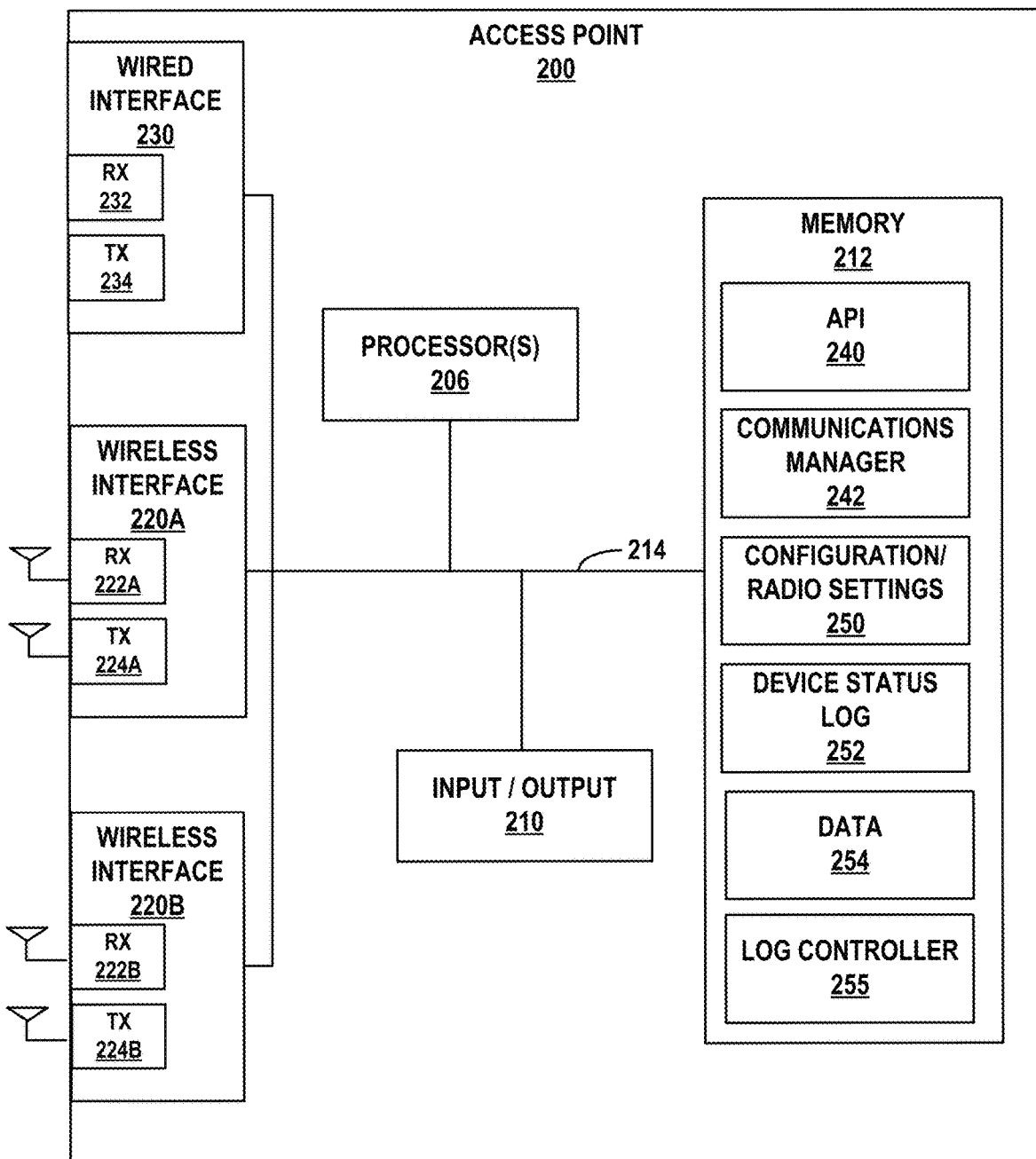
FIG. 2 is a block diagram of an example access point device in accordance with one or more techniques of the disclosure.

FIG. 2 is a block diagram of an example access point (AP) device 200 configured in accordance with one or more techniques of the disclosure. Example access point 200 shown in FIG. 2 may be used to implement any of AP devices 142 as shown and described herein with respect to FIG. 1A. Access point device 200 may comprise, for example, a Wi-Fi, Bluetooth and/or Bluetooth Low Energy (BLE) base station or any other type of wireless access point.

In the example of FIG. 2, access point device 200 includes a wired interface 230, wireless interfaces 220A-220B, one or more processor(s) 206, memory 212, and a user interface 210, coupled together via a bus 214 over which the various elements may exchange data and information. Wired interface 230 represents a physical network interface and includes a receiver 232 and a transmitter 234 for sending and receiving network communications, e.g., packets. Wired interface 230 couples, either directly or indirectly, access point device 200 to network(s) 134 of FIG. 1A. First and second wireless interfaces 220A and 220B represent wireless network interfaces and include receivers 222A and 222B, respectively, each including a receive antenna via which access point 200 may receive wireless signals from wireless communications devices, such as UEs 148 of FIG. 1A. First and second wireless interfaces 220A and 220B further include transmitters 224A and 224B, respectively, each including transmit antennas via which access point 200 may transmit wireless signals to wireless communications devices, such as UEs 148 of FIG. 1A. In some examples, first wireless interface 220A may include a Wi-Fi 802.11 interface (e.g., 2.4 GHz and/or 5 GHz) and second wireless interface 220B may include a Bluetooth interface and/or a Bluetooth Low Energy (BLE) interface. However, these are given for example purposes only, and the disclosure is not limited in this respect.

Processor(s) 206 are programmable hardware-based processors configured to execute software instructions, such as those used to define a software or computer program, stored to a computer-readable storage medium (such as memory 212), such as non-transitory computer-readable mediums including a storage device (e.g., a disk drive, or an optical drive) or a memory (such as Flash memory or RAM) or any other type of volatile or non-volatile memory, that stores instructions to cause the one or more processors 206 to perform one or more of the techniques described herein.

Memory 212 includes one or more devices configured to store programming modules and/or data associated with operation of access point device 200. For example, memory 212 may include a computer-readable storage medium, such as non-transitory computer-readable mediums including a storage device (e.g., a disk drive, or an optical drive) or a memory (such as Flash memory or RAM) or any other type of volatile or non-volatile memory, that stores instructions to cause the one or more processor(s) 206 to perform one or more of the techniques described herein.

In this example, memory 212 stores executable software including an application programming interface (API) 240, a communications manager 242, configuration settings 250, a device status log 252 and data storage 254. Device status log 252 includes network data, e.g., a list of network parameters and/or network events, specific to AP device 200 and/or client devices currently or previously associated with AP device 200. The network data may include, for example, any network parameter and/or network data indicative of one or more aspects of performance of the wireless network or of the AP device 200 itself. In some examples, the network data may include a plurality of states measured periodically as time series data. The network data may be measured by the UE devices 148 and transmitted to AP device 200, may be measured by AP device 200 itself or by any other device associated with the wireless network and transmitted to AP device 200.

Network data stored in data storage 254 may include, for example, AP events and/or UE events. In some examples, the network events are classified as positive network events (otherwise referred to herein as "successful network events" or "successful events"), neutral network events, and/or negative network events (otherwise referred to herein as "failure network events" or "failure events"). The network events may include, for example, memory status, reboot events, crash events, Ethernet port status, upgrade failure events, firmware upgrade events, configuration changes, authentication events, DNS events, DHCP events, one or more types of roaming events, one or more types of proximity events, client authentication events (e.g., success and/or failures), etc., as well as a time and date stamp for each event. Log controller 255 determines a logging level for the device based on instructions from NMS 130. Data 254 may store any data used and/or generated by access point device 200, including data collected from UEs 148, such as successful events, failure events, and/or neutral events, that is transmitted by access point device 200 for cloud-based management of wireless networks 106A by NMS 130.

Communications manager 242 includes program code that, when executed by processor(s) 206, allow access point 200 to communicate with UEs 148 and/or network(s) 134 via any of interface(s) 230 and/or 220A-220B. Configuration settings 250 include any device settings for access point 200 such as radio settings for each of wireless interface(s) 220A-220B. These settings may be configured manually or may be remotely monitored and/or automatically managed or configured by NMS 130 to optimize wireless network performance on a periodic (e.g., hourly or daily) basis.

Input/output (I/O) 210 represents physical hardware components that enable interaction with a user, such as buttons, a touchscreen, a display and the like. Although not shown, memory 212 typically stores executable software for controlling a user interface with respect to input received via I/O 210.

Figure 3A:
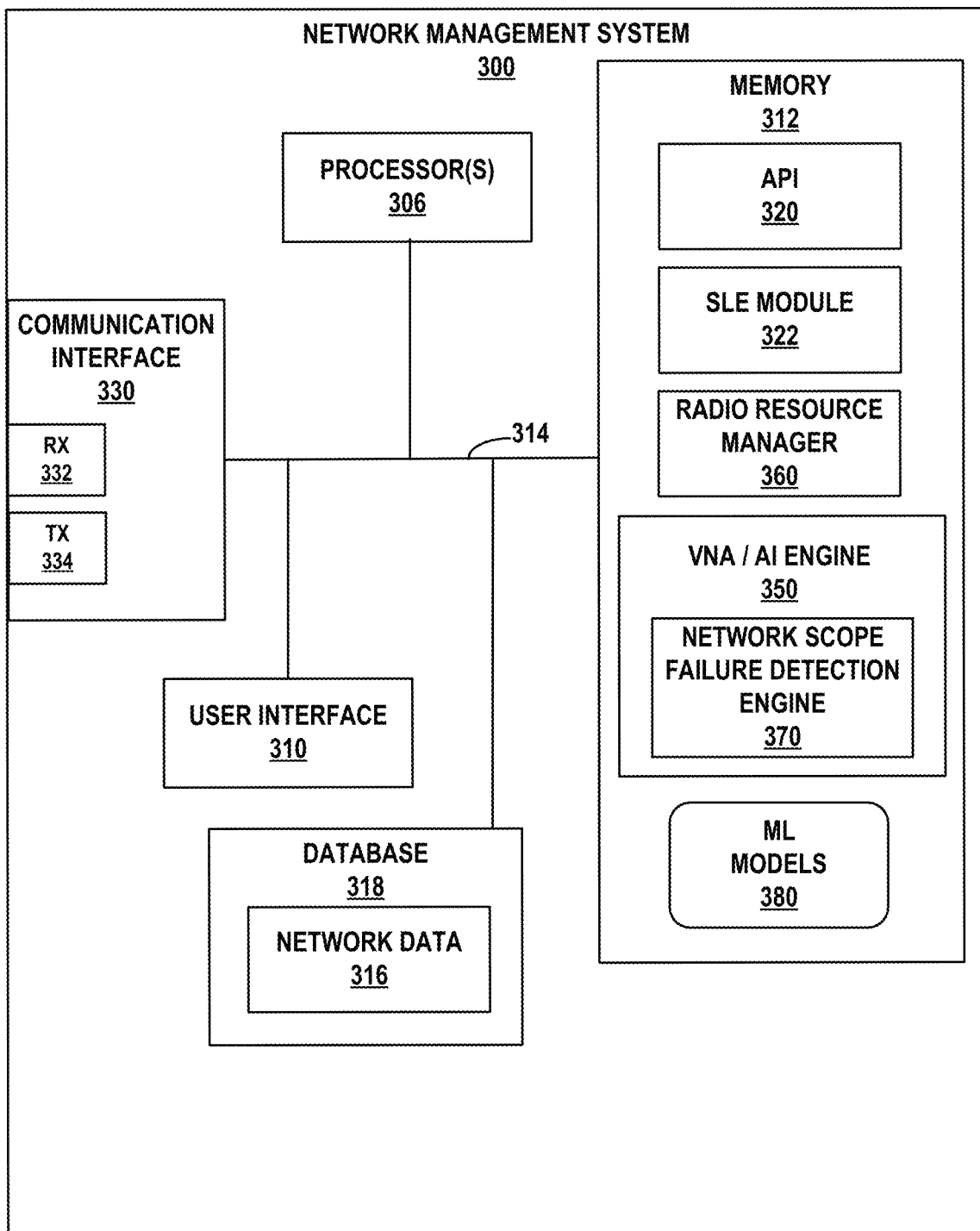
FIGS. 3A and 3B are a block diagrams of an example network management system configured to identify root cause of failure through the detection of network scope failures, in accordance with one or more techniques of the disclosure.
Figure 3B:
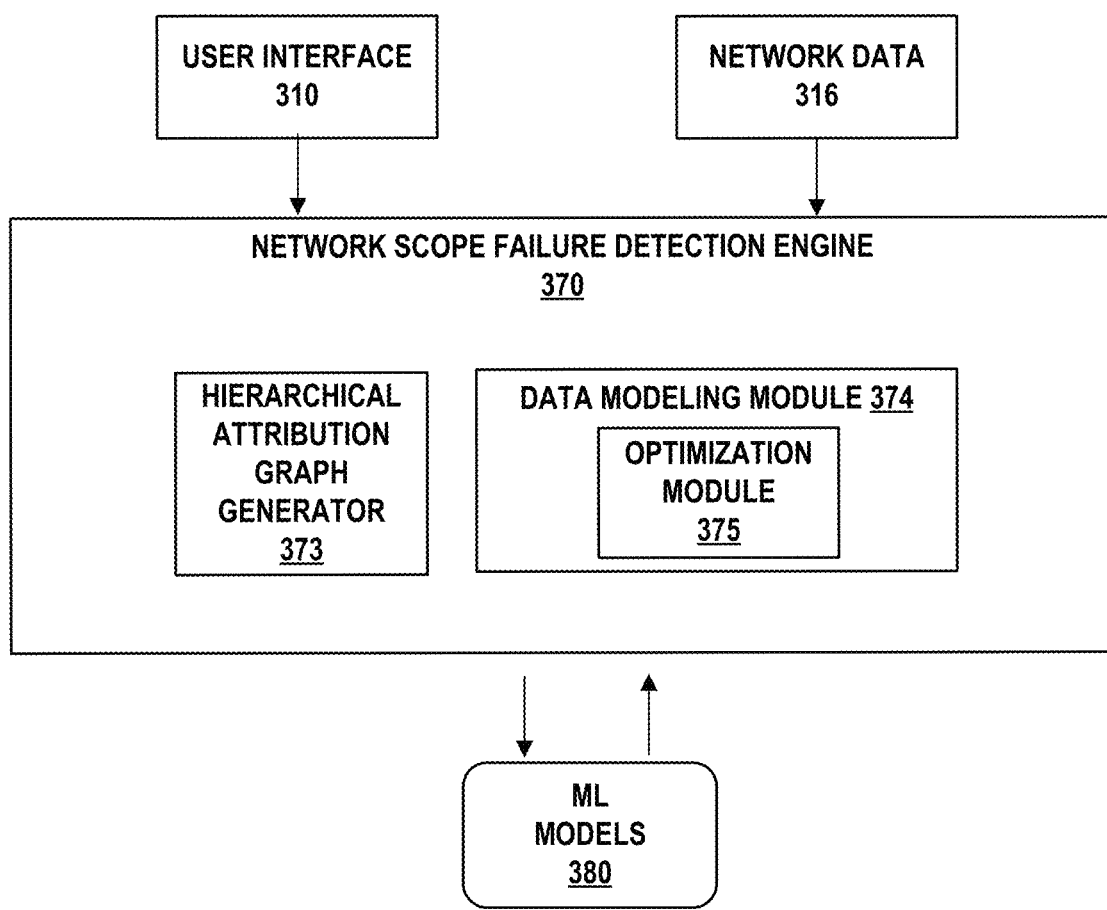

FIGS. 3A and 3B are block diagrams of an example network management system configured to identify root cause of failure through the detection of network scope failures, in accordance with one or more techniques of the disclosure. In the example of FIG. 3A, NMS 300 may be used to implement, for example, NMS 130 in FIG. 1A. In such examples, NMS 300 is responsible for monitoring and management of one or more wireless networks 106A-106N at sites 102A-102N, respectively. In some examples, NMS 300 receives network data collected by AP devices 142 from UEs 148, such as network data used to generate one or more events (e.g., successful events and/or failure events), and analyzes this data for cloud-based management of wireless networks 106A-106N. In some examples, NMS 300 may be part of another server shown in FIG. 1A or a part of any other server.

NMS 300 includes a communications interface 330, one or more processor(s) 306, a user interface 310, a memory 320, and a database 312. The various elements are coupled together via a bus 314 over which the various elements may exchange data and information.

Processor(s) 306 execute software instructions, such as those used to define a software or computer program, stored to a computer-readable storage medium (such as memory 320), such as non-transitory computer-readable mediums including a storage device (e.g., a disk drive, or an optical drive) or a memory (such as Flash memory or RAM) or any other type of volatile or non-volatile memory, that stores instructions to cause the one or more processors 306 to perform the techniques described herein.

Communications interface 330 may include, for example, an Ethernet interface. Communications interface 330 couples NMS 300 to a network and/or the Internet, such as any of network(s) 134 as shown in FIG. 1A, and/or any local area networks. Communications interface 330 includes a receiver 332 and a transmitter 334 by which NMS 300 receives/transmits data and information to/from any of AP devices 142, servers 110, 116, 122, 128 and/or any other devices or systems forming part of network 100 such as shown in FIG. 1A. The data and information received by NMS 300 may include, for example, network data and/or event log data received from AP devices 142 used by NMS 300 to remotely monitor and/or control the performance of wireless networks 106A-106N. Database 318 of NMS 300 may store the network data and/or event log data received from AP devices 142. NMS may further transmit data via communications interface 330 to any of network devices such as AP devices 142 at any of network sites 102A-102N to remotely manage wireless networks 106A-106N.

Memory 320 includes one or more devices configured to store programming modules and/or data associated with operation of NMS 300. For example, memory 320 may include a computer-readable storage medium, such as non-transitory computer-readable mediums including a storage device (e.g., a disk drive, or an optical drive) or a memory (such as Flash memory or RAM) or any other type of volatile or non-volatile memory, that stores instructions to cause the one or more processor(s) 306 to perform the techniques described herein.

In this example, memory 312 includes an API 320, SLE module 322, a radio resource management (RRM) engine 360, a virtual network assistant (VNA)/AI engine 350, and a machine learning model 380. NMS 300 may also include any other programmed modules, software engines and/or interfaces configured for remote monitoring and management of wireless networks 106A-106N, including remote monitoring and management of any of AP devices 142.

RRM engine 360 monitors one or more metrics for each site 106A-106N in order to learn and optimize the radio-frequency (RF) environment at each site. For example, RRM engine 360 may monitor the coverage and capacity SLE metrics (e.g., managed by SLE module 322) for a wireless network 106 at a site 102 in order to identify potential issues with coverage and/or capacity in the wireless network 106 and to make adjustments to the radio settings of the access points at each site to address the identified issues. RRM engine 360 may determine channel and transmit power distribution across all AP devices 142 in each network 106A-106N. RRM engine 360 may monitor events, power, channel, bandwidth, and number of clients connected to each AP device. RRM engine 360 may further automatically change or update configurations of one or more AP devices 142 at a site 106 with an aim to improve the coverage and/or capacity SLE metrics and thus to provide an improved wireless experience for the user.

VNA/AI engine 350 analyzes network data received from AP devices 142 as well as its own data to monitor performance of wireless networks 106A-106N. For example, VNA engine 350 may identify when anomalous or abnormal states are encountered in one of wireless networks 106A-106N. In accordance with the techniques described in this disclosure, VNA/AI engine 350 may include a network scope failure detection engine 370 to detect network scope failures and/or identify the root cause of any anomalous or abnormal states. Network scope failure detection engine 370 may represent an example implementation of network failure detection engine 135 of FIG. 1A. In some examples, the network scope failure detection engine 370 utilizes artificial intelligence-based techniques and/or machine learning models 380 to help detect network scope failures by evaluating failure network events with respect to each network scope (e.g., node) of a hierarchical attribution graph (e.g., hierarchical attribution graph 136 of FIG. 1A). Additionally, or alternatively, network scope failure detection engine 370 utilizes artificial intelligence-based techniques and/or machine learning models 380 to identify whether a particular network scope (e.g., particular node in hierarchical attribution graph) is the root cause of failure. A more detailed view of network scope failure detection engine 370 is described and illustrated in FIG. 3B.

In addition, VNA/AI engine 350 may automatically invoke one or more remedial actions intended to address the identified root cause(s) of failure. Examples of remedial actions that may be automatically invoked by VNA/AI engine 350 may include, but are not limited to, invoking RRM 360 to reboot one or more AP devices and/or adjust/modify the transmit power of a specific radio in a specific AP device, adding service set identifier (SSID) configuration to a specific AP device, changing channels on an AP device or a set of AP devices, etc. The remedial actions may further include restarting a switch and/or a router, invoke downloading of new software to an AP device, switch, or router, etc. In some examples, the remedial actions may also include restarting a server. These remedial actions are given for example purposes only, and the disclosure is not limited in this respect. If automatic remedial actions are not available or do not adequately resolve the root cause, VNA/AI engine 350 may proactively and automatically provide a notification including recommended remedial actions to be taken by IT personnel to address the anomalous or abnormal wireless network operation.

In some examples, the detection of network scope failure and identification of root cause of failure can be applied to an issue/bug tracking system to determine the priority an issue/failure should be assigned. For example, VNA/AI engine 350 may include a priority module (not shown) to assign priorities of issues based on the output generated by the network scope failure detection engine 370. For example, network scope failure detection engine 370 may detect a particular network scope has failed and identify whether the particular network scope (e.g., particular node in hierarchical attribution graph) is the root cause of failure. The network scope failure detection engine 370 may further determine the number of client devices that are affected by that failure. Using the identified root cause of failure and the number of affected client devices, the priority module may assign a priority value to indicate the priority of the issue/failure. For example, a failure to a particular AP device with a limited number of connected client devices may be assigned a lower priority. Alternatively, or additionally, an organization or server failure may affect a whole department and may be assigned a higher priority. In some examples, a user may configure the priority value based any number of affected client devices. In these examples, VNA/AI engine 350 may automatically invoke one or more remedial actions based on the priorities assigned by the priority module to the identified root cause of failure.

In the example of FIG. 3B, network scope failure detection engine 370 may include hierarchical attribution graph generator 373 and data modeling module 374. Network scope failure detection engine 370 may include some or all of these modules, and may also include other modules for detection of network scope failures.

Figure 6:
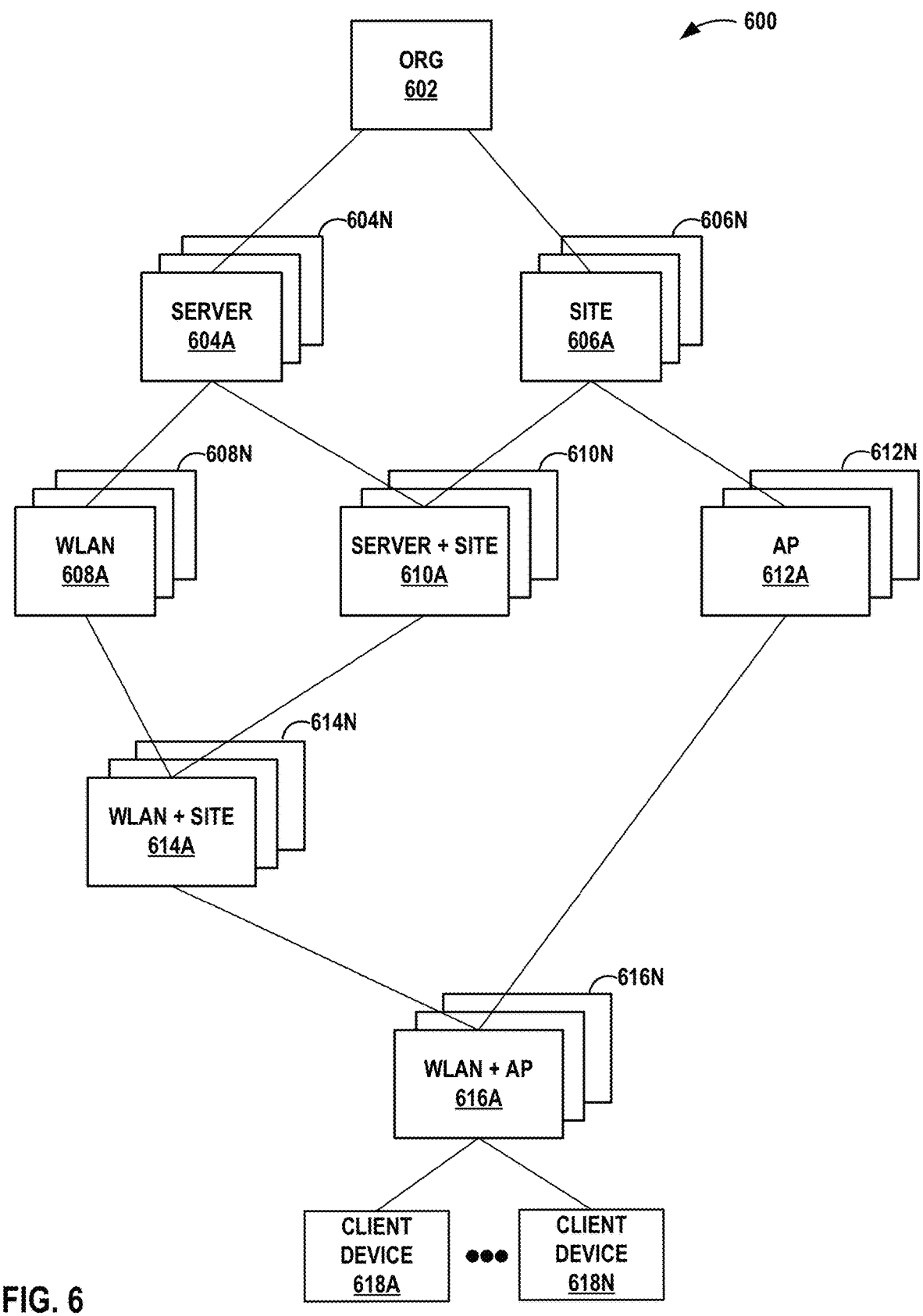
FIG. 6 illustrates an example of a hierarchical attribution graph for detection of network scope failures, in accordance with the techniques described in this disclosure.

Hierarchical attribution graph generator 373 may generate a hierarchical attribution graph (e.g., hierarchical attribution graph 136 of FIG. 1A, hierarchical attribution graph 600 of FIG. 6). As further described below in FIG. 6, hierarchical attribution graph may include attributes representing network scopes and attribute relationships, such as attribute containment relationships (e.g., SERVER→WLAN) and attribute cross-link relationships as combined attributes (e.g., WLAN+AP).

Network scope detection failure engine 370 may apply ML models 380 to a hierarchical attribution graph generated by hierarchical attribution graph generator 373 and one or more network events received by NMS 300 (e.g., included in network data 316). The events may comprise successful network events, failure network events, and/or other network events associated with one or more client devices. ML models 380 may comprise of different supervised ML models that are applied to different network scopes in the hierarchical attribution graph. For instance, network scope failure detection engine 370 may apply a first supervised ML model to a first network scope in the hierarchical attribution graph (e.g., WLAN+AP attribute), additionally or alternatively, network scope failure detection engine 370 may apply a second supervised ML model to a second network scope in the hierarchical attribution graph (e.g., WLAN attribute). Each of the supervised ML models may be configured with one or more parameters (e.g., model labels) to detect network scope failure, as further described in FIG. 8 below. For example, an ML model for a particular network scope (e.g., WLAN attribute) may include model labels such as a count of clients threshold, count of failure events threshold, duration threshold, and/or roaming threshold. As described further below, the network scope detection failure engine 370 may compare network event data associated with one or more client devices with a severity score generated from the machine learning model (e.g., based on the configured model labels) applied to a particular network scope. Based on the severity score, network scope failure detection engine 370 may determine that the particular network scope has failed.

Network scope failure detection engine 370 may additionally, or alternatively, evaluate the failure network events with respect to each of the nodes of the hierarchical attribution graph 136 to identify the root cause of the failure. As further described in FIGS. 7A and 7B below, network scope failure detection engine 370 may evaluate the failure network events with respect to a particular network scope (e.g., particular node in the hierarchical attribution graph 136) to determine whether to attribute the failure to a higher scope level (e.g., a node with a higher hierarchy) in the hierarchical attribution graph 136. Network scope failure detection engine 370 may, as one example, evaluate failure network events with respect to the node with the lowest hierarchy in the hierarchical attribution graph 136 and, if network scope failure detection engine 370 determines the failure is attributed to a higher scope level, progressively evaluate failure network events with respect to a node with a higher hierarchy. If the failure is not attributed to a higher scope level, network scope failure detection engine 370 may determine that the root cause of the failure is with the current network scope.

By applying ML models 380 to the hierarchical attribution graph and network events, network scope detection failure engine 370 may detect network scope failure and or identify the root cause of error conditions. The network scope detection failure engine 370 may, in some examples, execute a parallel process and/or a funnel process to detect network scope failure and/or identify root cause of failure, as further described below in FIGS. 7A and 7B, respectively.

In some examples, network scope detection failure engine 370 includes a data modeling module 374 to model the network data 316 for the network scope failure detection process. In some examples, data modeling module 374 includes an optimization module 375 to optimize the network scope failure detection process. For example, optimization module 375 may filter out irrelevant and/or unnecessary events (e.g., neutral events) to reduce the number of records to process. Additional details of data modeling module 374 and the data modeling process are described in FIG. 8 below.

Figure 4:
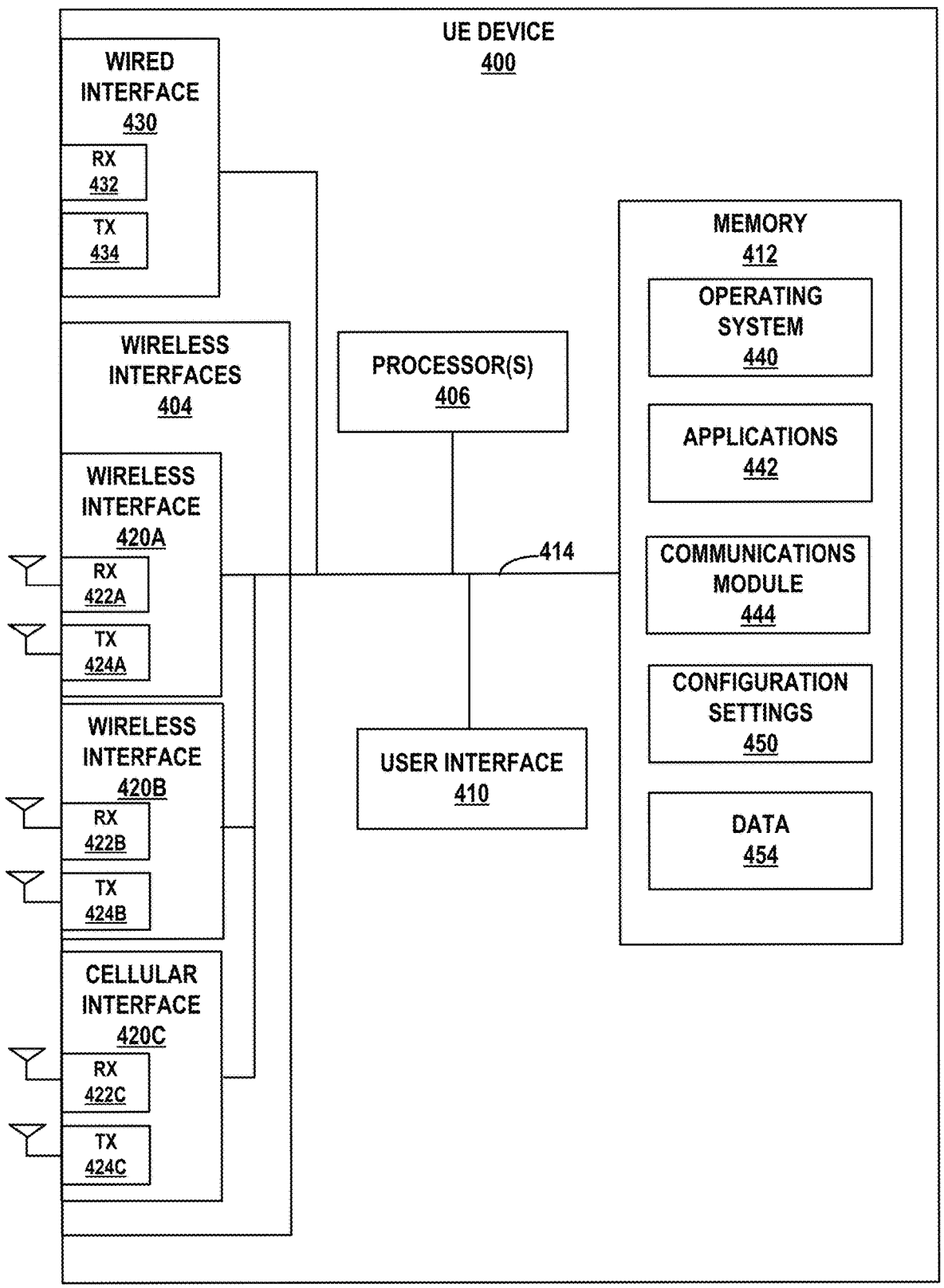
FIG. 4 is a block diagram of an example user equipment device in accordance with one or more techniques of the disclosure.

FIG. 4 shows an example user equipment (UE) device 400. Example UE device 400 shown in FIG. 4 may be used to implement any of UEs 148 as shown and described herein with respect to FIG. 1A. UE device 400 may include any type of wireless client device, and the disclosure is not limited in this respect. For example, UE device 400 may include a mobile device such as a smart phone, tablet or laptop computer, a personal digital assistant (PDA), a wireless terminal, a smart watch, a smart ring or any other type of mobile or wearable device. UE 400 may also include any type of IoT client device such as a printer, a security sensor or device, an environmental sensor, or any other connected device configured to communicate over one or more wireless networks.

In accordance with one or more techniques of the disclosure, network data may be stored in UE memory 412 as network data 454 and transmitted to NMS 130/300 via one or more AP devices 142 in the wireless network. For example, NMS 130 receives network data from UEs 148 in networks 106A-106N of FIG. 1A. In some examples, NMS 130 receives relevant network data from UEs 148 on a continuous basis (e.g., every 2 seconds or other appropriate time period), and NMS may determine the connection status of each UE to the network. The network data 454 may include, for example, a log of one or more UE associated events or states (e.g., failure event, successful event, neutral event, etc.), and any other data or event relevant for determination of the connection status of the UE.

UE device 400 includes a wired interface 430, wireless interfaces 420A-420C, one or more processor(s) 406, memory 412, and a user interface 410. The various elements are coupled together via a bus 414 over which the various elements may exchange data and information. Wired interface 430 includes a receiver 432 and a transmitter 434. Wired interface 430 may be used, if desired, to couple UE 400 to network(s) 134 of FIG. 1A. First, second and third wireless interfaces 420A, 420B, and 420C include receivers 422A, 422B, and 422C, respectively, each including a receive antenna via which UE 400 may receive wireless signals from wireless communications devices, such as AP devices 142 of FIG. 1A, AP device 200 of FIG. 2, other UEs 148, or other devices configured for wireless communication. First, second, and third wireless interfaces 420A, 420B, and 420C further include transmitters 424A, 424B, and 424C, respectively, each including transmit antennas via which UE 400 may transmit wireless signals to wireless communications devices, such as AP devices 142 of FIG. 1A, AP device 200 of FIG. 2, other UEs 138 and/or other devices configured for wireless communication. In some examples, first wireless interface 420A may include a Wi-Fi 802.11 interface (e.g., 2.4 GHz and/or 5 GHz) and second wireless interface 420B may include a Bluetooth interface and/or a Bluetooth Low Energy interface. Third wireless interface 420C may include, for example, a cellular interface through which UE device 400 may connect to a cellular network.

Processor(s) 406 execute software instructions, such as those used to define a software or computer program, stored to a computer-readable storage medium (such as memory 412), such as non-transitory computer-readable mediums including a storage device (e.g., a disk drive, or an optical drive) or a memory (such as Flash memory or RAM) or any other type of volatile or non-volatile memory, that stores instructions to cause the one or more processors 406 to perform the techniques described herein.

Memory 412 includes one or more devices configured to store programming modules and/or data associated with operation of UE 400. For example, memory 412 may include a computer-readable storage medium, such as non-transitory computer-readable mediums including a storage device (e.g., a disk drive, or an optical drive) or a memory (such as Flash memory or RAM) or any other type of volatile or non-volatile memory, that stores instructions to cause the one or more processor(s) 406 to perform the techniques described herein.

In this example, memory 412 includes an operating system 440, applications 442, a communications module 444, configuration settings 450, and data storage for network data 454. Data storage for network data 454 may include, for example, a status/error log including network data specific to UE 400. As described above, network data 454 may include any network data, events, and/or states that may be related to determination of one or more roaming quality assessments. The network data may include event data such as a log of normal events and error events according to a logging level based on instructions from the network management system (e.g., NMS 130/300). Data storage for network data 454 may store any data used and/or generated by UE 400, such as network data used to determine connection status of the UE to the network, that is collected by UE 400 and transmitted to any of AP devices 138 in a wireless network 106 for further transmission to NMS 130.

Communications module 444 includes program code that, when executed by processor(s) 406, enables UE 400 to communicate using any of wired interface(s) 430, wireless interfaces 420A-420B and/or cellular interface 450C. Configuration settings 450 include any device settings for UE 400 settings for each of wireless interface(s) 420A-420B and/or cellular interface 420C.

Figure 5:
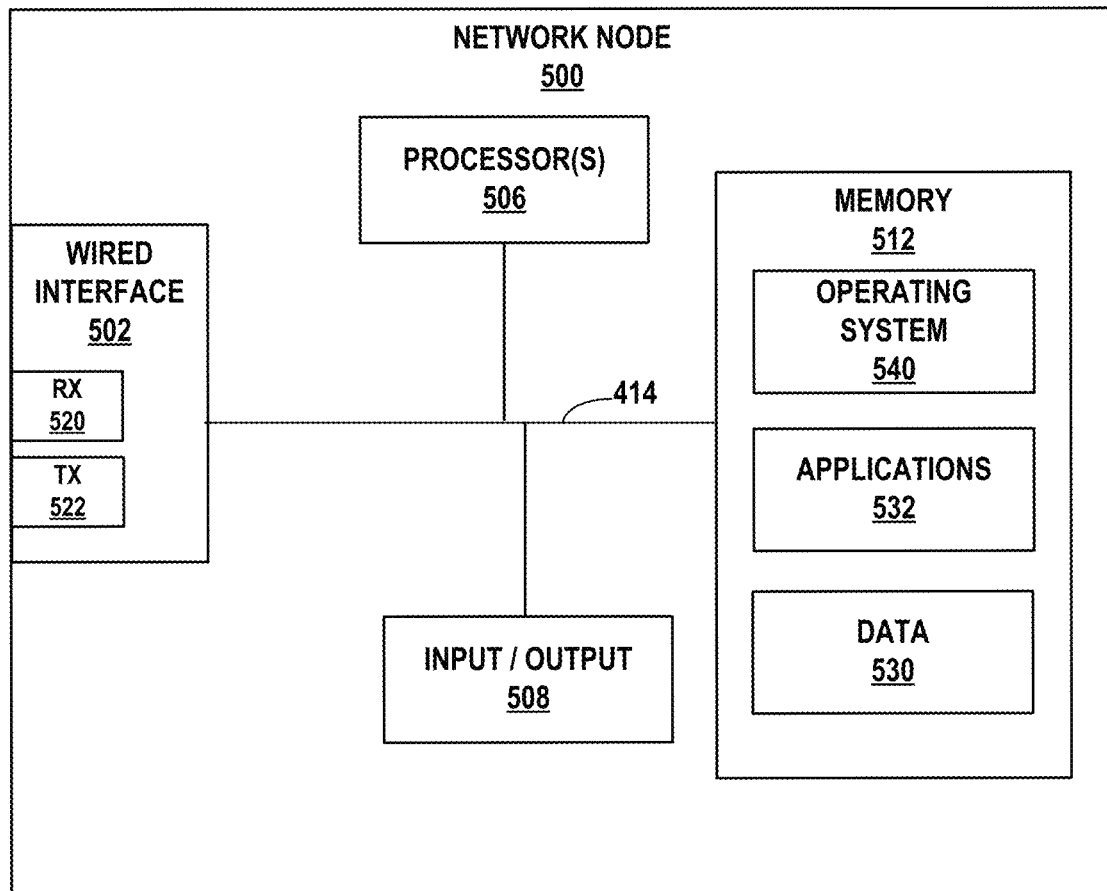
FIG. 5 is a block diagram of an example network node, such as a router or switch, in accordance with one or more techniques of the disclosure.

FIG. 5 is a block diagram illustrating an example network node 500 configured according to the techniques described herein. In one or more examples, the network node 500 implements a device or a server attached to the network 134 of FIG. 1A, e.g., router, switch, AAA server 110, DHCP server 116, DNS server 122, VNA 133, web server 128A-128X, etc., or a network device such as, e.g., routers, switches or the like.

In this example, network node 500 includes a communications interface 502, e.g., an Ethernet interface, a processor 506, input/output 508, e.g., display, buttons, keyboard, keypad, touch screen, mouse, etc., a memory 512 and an assembly of components 516, e.g., assembly of hardware module, e.g., assembly of circuits, coupled together via a bus 509 over which the various elements may interchange data and information. Communications interface 502 couples the network node 500 to a network, such as an enterprise network.

Though only one interface is shown by way of example, those skilled in the art should recognize that network nodes may have multiple communication interfaces. Communications interface 502 includes a receiver 520 via which the network node 500 can receive data and information (e.g., including operation related information such as registration request, AAA services, DHCP requests, Simple Notification Service (SNS) look-ups, and Web page requests). Communications interface 502 includes a transmitter 522, via which the network node 500 can send data and information (e.g., including configuration information, authentication information, web page data, etc.).

Memory 512 stores executable software applications 532, operating system 540 and data/information 530. Data 530 includes system log and/or error log that stores network data for node 500 and/or other devices, such as wireless access points, based on a logging level according to instructions from the network management system. Network node 500 may, in some examples, forward the network data to a network management system (e.g., NMS 130 of FIG. 1A) for analysis as described herein.

FIG. 6 illustrates an example hierarchical attribution graph, in accordance with the techniques described in this disclosure. The hierarchical attribution graph 600 of FIG. 6 is an example implementation of hierarchical attribution graph 136 of FIG. 1A. In the example of FIG. 6, hierarchical attribution graph 600 is described with respect to network system 100 of FIG. 1A and network scope detection failure engine 370 of FIG. 3B.

The hierarchical attribution graph generator 373 of network scope failure detection engine 370 may receive network data 316 including configuration information of the organization (e.g., identifiers of each network scope, such as site identifiers, AP device identifiers, etc.) and generate hierarchical attribution graph 600. In this example, hierarchical attribution graph 600 includes attributes representing different network scopes (e.g., organization, servers, sites, WLANs, AP devices, client devices) of network system 100 of FIG. 1A. In this example, the organization attribute 602 may represent an organization including (i.e., "containing") a plurality of server attributes 604A-604N (collectively, "server attributes 604") representing servers 110, 116, 122, 128A-128X of FIG. 1A, and a plurality of site attributes 606A-606N (collectively, "site attributes 606") representing sites 102A-102N of FIG. 1A. Hierarchical attribution graph 600 includes an organization attribute 602 assigned with the highest hierarchy level and is connected to each server attribute 604 on the next hierarchy level to represent the containment relationship between the organization and the plurality of servers. Similarly, organization attribute 602 is connected to each site attribute 606 on the next hierarchy level to represent the containment relationship between the organization and the plurality of sites.

Hierarchical attribution graph 600 also includes the containment relationship of a server (e.g., server 128A of FIG. 1A) of the organization and one or more WLANs (e.g., wireless networks 106A-106N of FIG. 1A). For example, server attribute 604A may represent server 128A and is connected to WLAN attributes 608A-608N (collectively, "WLAN attributes 608") that represent wireless networks 106A-106N, respectively, (or a subset of the wireless networks 106) on the next hierarchy level to represent the relationship that server attribute 604A "contains" WLAN attributes 608A-608N. For ease of illustration, hierarchical attribution graph 600 is illustrated with the attribute containment relationship for only server attribute 604A and WLAN attributes 608, but may also include attribute containment relationships for each server attribute (e.g., server attribute 604B-604N) representing the other server containment relationships between other servers and wireless networks within network system 100.

Similarly, hierarchical attribution graph 600 includes the containment relationship of a site (e.g., site 102A of FIG. 1A) of the organization and one or more AP devices (e.g., AP devices 142A of FIG. 1A). For example, site attribute 606A may represent site 102A and is connected to AP device attributes 612A-612N (collectively, "AP device attributes 612") representing AP devices 142A-1 through 142A-M of FIG. 1A, respectively, on the next hierarchy level to represent the relationship that site attribute 606A "contains" AP device attributes 612A-612N. For ease of illustration, hierarchical attribution graph 600 is illustrated with the attribute containment relationship for only site attribute 604A and AP device attributes 612A-612N, but may also include attribute containment relationships for each site attribute (e.g., site attribute 606B-606N) representing the other site containment relationships between other sites and AP devices within network system 100.

Hierarchical attribution graph 600 also includes attribute cross-link relationships representing the cross-link relationship between an attribute with another attribute. For example, a server 128A of FIG. 1A may be accessible by one or more AP devices within site 102A. In this example, hierarchical attribution graph 600 includes a combined attribute of server attribute 604A and site attribute 606A (illustrated in FIG. 6 as "SERVER+SITE 610A") and is connected to server attribute 604A and site attribute 606A, respectively, to represent the cross-link relationship between server 128A and site 102A. Other cross-link relationships between server attributes 604 and site attributes 606 may be included in hierarchical attribution graph 600, such as SERVER+SITE attributes 610B-610N, but are not shown for ease of illustration.

Similarly, hierarchical attribution graph 600 includes an attribute cross-link relationship representing the cross-link relationship between wireless network 106A and site 102A. In this example, hierarchical attribution graph 600 includes a combined attribute of WLAN attribute 608A and site attribute 606A (illustrated in FIG. 6 as WLAN+SITE 614A") and connected to WLAN attribute 608A and site attribute 606A, respectively, to represent the cross-link relationship between wireless network 106A and site 102A. As site attribute 606A is at a higher hierarchy level than server attribute 604A, WLAN attribute 608A is combined with site attribute 606A. Other cross-link relationships between WLAN attributes 608 and site attributes 606 may be included in hierarchical attribution graph 600, such as WLAN+SITE attributes 614B-614N, but not shown for ease of illustration.

Likewise, hierarchical attribution graph 600 includes an attribute cross-link relationship representing the cross-link relationship between wireless network 106A and AP device 142A-1. In this example, hierarchical attribution graph 600 includes a combined attribute of WLAN attribute 608A and AP device attribute 612A (illustrated in FIG. 6 as WLAN+ AP 616A") and connected to WLAN attribute 608A and AP device attribute 612A, respectively, to represent the cross-link relationship between wireless network 106A and AP device 142A-1. As WLAN attribute 608A is at a higher hierarchy level than site attribute 606A, WLAN attribute 608A is combined with AP device attribute 616A. Other cross-link relationships between WLAN attributes 608 and AP device attributes 612 may be included in hierarchical attribution graph 600, but are not shown for ease of illustration. Network scope detection failure engine 370 may apply ML models 380 to hierarchical attribution graph 600 and one or more network events received by NMS 300 (e.g., included in network data 316), to evaluate the one or more network events with respect to each node of the hierarchical attribution graph 600 to detect network scope failures and/or identify the root cause of failure, as further described in FIGS. 7A and 7B below.

Hierarchical attribution graph 600 of FIG. 6 is an example of a hierarchical attribution graph of network system 100 of a single organization. In some examples, an AP device of network system 100, e.g., AP device 142N-M, provides access to another organization or remote network system through a switch and/or router. In these examples, the hierarchical attribution graph may include the switch and/or router as an attribute of the graph that is connected to the AP device attribute and may further evaluate whether the failure may be attributed to the switch and/or router.

Figure 7A:
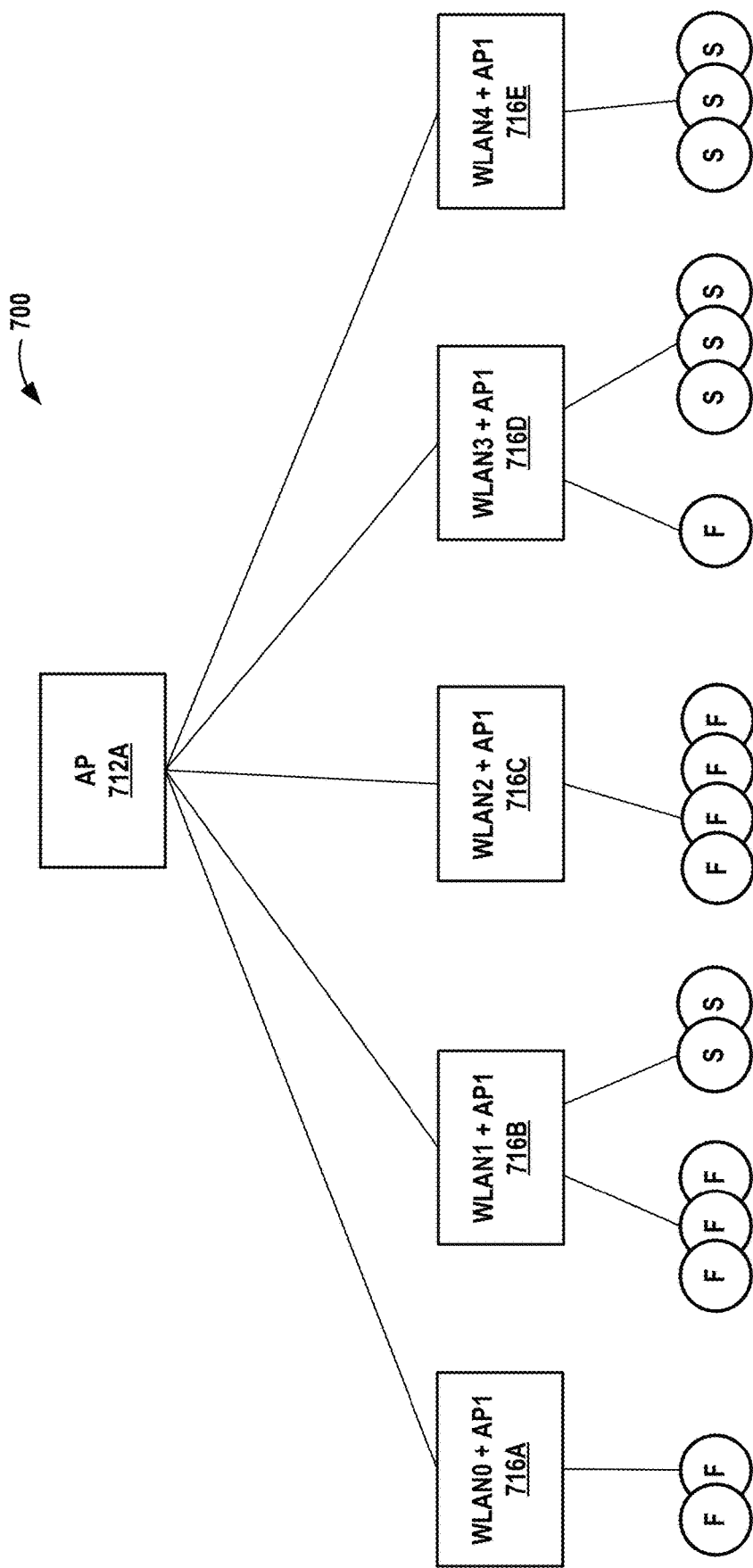
FIGS. 7A and 7B illustrate example network scope failure detection processes performed by a network scope failure detection engine, in accordance with the techniques described in this disclosure.
Figure 7B:
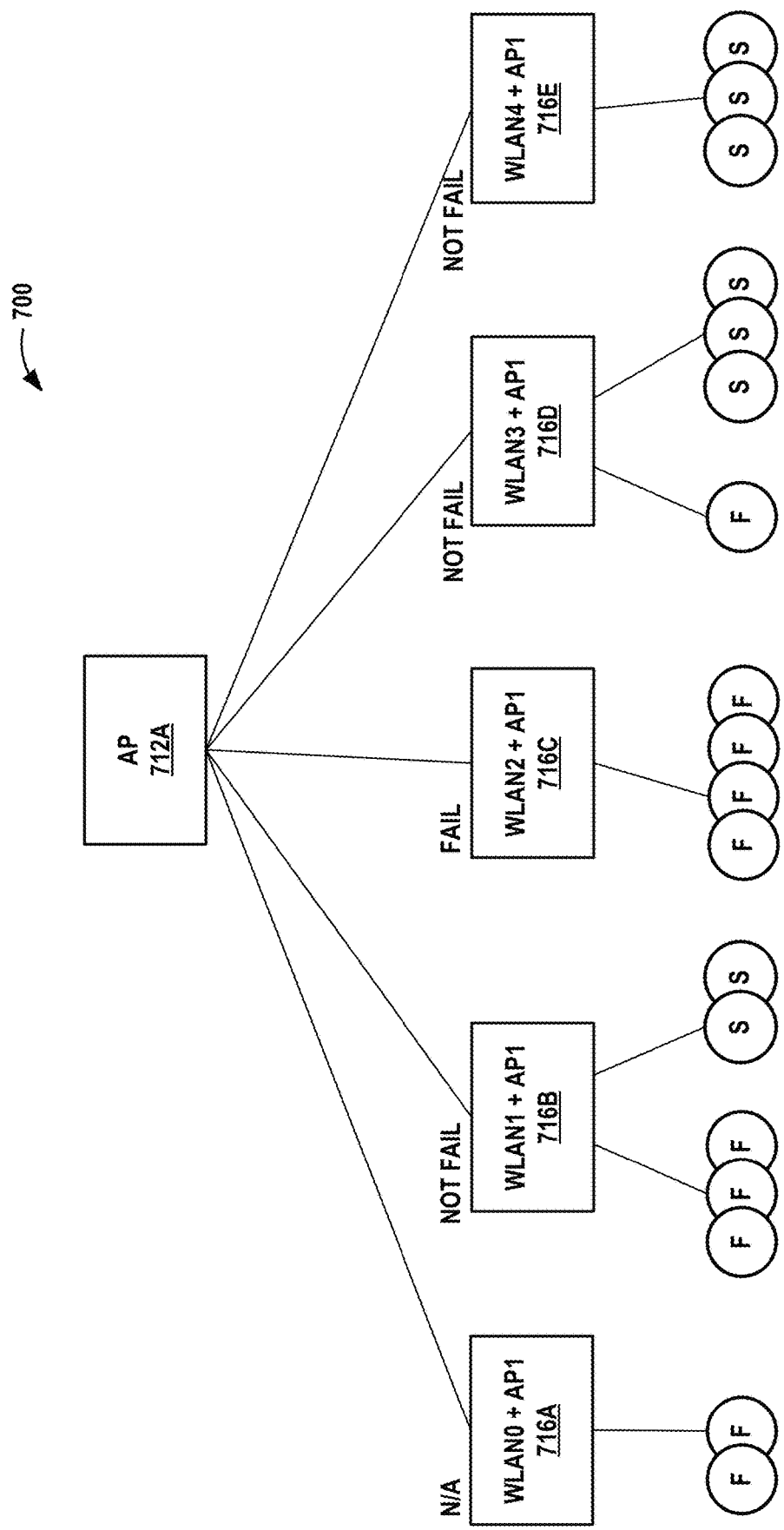

FIGS. 7A and 7B illustrate example network scope failure detection processes performed by network scope failure detection engine 135, in accordance with the techniques described in this disclosure. Hierarchical attribution graph 700 of FIG. 7A illustrates an example portion of hierarchical attribution graph 600 of FIG. 6. For example, hierarchical attribution graph 700 includes AP device attribute 712A that represents AP device attribute 612A of FIG. 6 and combined attributes 716A-716E that represent WLAN+AP attributes 616A-616N of FIG. 6. In this example, client devices are connected to AP device (e.g., AP1) that provides a plurality of wireless networks (e.g., WLAN0 through WLAN4).

To detect network scope failures, network scope failure detection engine 370 may apply machine learning models (e.g., ML models 380 of FIG. 3B) to hierarchical attribution graph 700 to evaluate network events (e.g., network data 316 of FIG. 3B) of client devices. In some examples, the hierarchical attribution graph 700 is converted to a directed acyclic graph (DAG) to be implemented with machine learning models. Network scope failure detection engine 370 may obtain client device network events including successful network events and/or failure network events to access a particular WLAN (e.g., WLAN0 through WLAN4) using a particular AP device (e.g., API).

In the example of FIG. 7A, network scope failure detection engine 370 may execute a parallel process to detect network scope failures and/or identify root cause of failure. For example, network scope failure detection engine 370 may evaluate each network scope level independently, for example, by applying a ML model for the network scope, and may attribute the failure to a higher network scope level if there is complete (100%) failure of the lower network scope level. For example, the network scope failure detection engine 370 may apply a ML model for AP device attribute 712A (i.e., AP device network scope level) that includes one or more model labels to determine if all client devices fail to access WLAN0-WLAN4 using API. In this example, network scope failure detection engine 370 determines that there are ten (10) client device failure network events (illustrated in FIG. 7A as "F") and eight (8) client device successful network events (illustrated in FIG. 7A as "S"). As described above, successful network events may include client authentication success (e.g., OKC, 802.11R), client authentication association success (OKC, 802.11R), client authentication re-association success (e.g., OKC, 802.11R), client domain name system (DNS) success, client reassociation, client gateway address resolution protocol (ARP) success, client IP assignment success. Failure network events may include client association failure, client authentication failure (e.g., OKC, 802.11R), repeated client authorization failures, etc.

Because there is at least one successful network event, the network scope failure detection engine 370 may determine that AP1 has not failed and may not attribute the failure to API. In contrast, if all client devices fail to access WLAN0-WLAN4 using AP1 (e.g., only failure network events), network scope failure detection engine 370 may attribute the failure to AP1. In some examples, the ML model may include additional parameters, such as the number of client devices, the duration, number of roaming events, etc., to determine whether a particular network scope has failed.

In the example of FIG. 7B, network scope failure detection engine 370 may execute a funnel process to detect of network scope failures and/or identify root cause of failure. For example, the network scope failure detection engine 370 may execute a funnel process to evaluate each attribute of a network scope level based on a lower network scope level. For example, the network scope failure detection engine 370 may individually evaluate each of WLAN+AP attributes 716A-716E by evaluating client device network events for each of the attributes. With funnel processing, the higher network scope level is evaluated only when the lower network scope has failed.

For example, network scope failure detection engine 370 may obtain client device network events and evaluate the network events with respect to each WLAN+AP attribute. For example, network scope failure detection engine 370 may apply an ML model for a WLAN+AP attribute and evaluate client device network events with respect to a particular WLAN+AP attribute. The ML model may include a model label (e.g., threshold) to determine if there are only failure network events and there are greater than or equal to a threshold number, e.g., three (X>=3), of failure network events generated as a result of client devices failing to access a particular WLAN using API. Although the example described has a threshold number of three failure network events, the threshold number may be any predetermined number of failure network events.

In this example, network scope failure detection engine 370 may apply an ML model to WLAN2+AP1 attribute 716C and determine that there are four (4) failure network events (illustrated in FIG. 7B as "F" connected to WLAN2+AP1 attribute 716C) with respect to WLAN2+AP1 attribute 716C, and may attribute the failure to a higher network scope level of WLAN2+AP1 attribute 716C.

Similarly, network scope failure detection engine 370 may apply an ML model to WLAN1+1AP attribute 716B and determine that there are three (3) failure network events (illustrated in FIG. 7B as "F" connected to WLAN1+AP1 attribute 716B) and two (2) successful network events (illustrated in FIG. 7B as "S" connected to WLAN1+AP1 attribute 716B) with respect to WLAN1+AP1 attribute 716B. In this example, network scope failure detection engine 370 may not attribute the failure to a higher network scope level of WLAN1+AP1 attribute 716B because there is at least one successful event.

Network scope failure detection engine 370 may similarly apply an ML model to WLAN0+1AP attribute 716A and determine that there is at least one successful event for each of the WLAN3+AP1 attribute 716D and WLAN4+AP1 attribute 716E. As such, network scope failure detection engine 370 may not attribute the failure to a higher network scope level of WLAN3+AP1 attribute 716D and WLAN4+AP1 attribute 716E.

In some examples, regardless of whether there is only client device network event failures, network scope failure detection engine 370 may not attribute the failure to a higher network scope level if there are less than e.g., three (X<3) client device failure network events, as defined in the ML model. That is, if there are less than three (X<3) client device failure network events, then the higher network scope level is not considered for failure detection. For example, network scope detection engine 370 may filter out network scope level of WLAN0+AP1 attribute 716A from consideration because there are only two client device failure network events (illustrated in FIG. 7B as "F" connected to WLAN0+AP1 attribute 716A).

Each of WLAN+AP attributes 716 is then evaluated to determine whether to attribute the failure to a higher network scope level (e.g., AP device attribute 712A). In this example, network scope failure detection engine 370 may not attribute the failure to AP device attribute 712A because not all of WLAN+AP attributes 716 have been attributed with the failure (e.g., WLAN1+AP1 attribute 716B, WLAN3+AP1 attribute 716D, and WLAN4+AP1 attribute 716E). In this way, network scope failure detection engine 370 does not need to re-valuate the client device network events with respect to a higher network scope level, such as AP device attribute 712A, and therefore reduces the amount of computation to detect network scope failures.

Although not shown in FIGS. 7A and 7B, network scope failure detection engine 370 may continue to evaluate each network scope level to determine whether to attribute the failure to a higher network scope level. For example, assume for example each of WLAN+AP attributes 716 have been attributed with the failure, and network scope failure detection engine 370 determines to attribute the failure to AP device attribute 712A, network scope failure detection engine 370 may then evaluate the next higher network scope level (e.g., AP device attribute level) to determine if the failure should be attributed to the higher attribute level (e.g., site attribute level), and so on.

Figure 8:
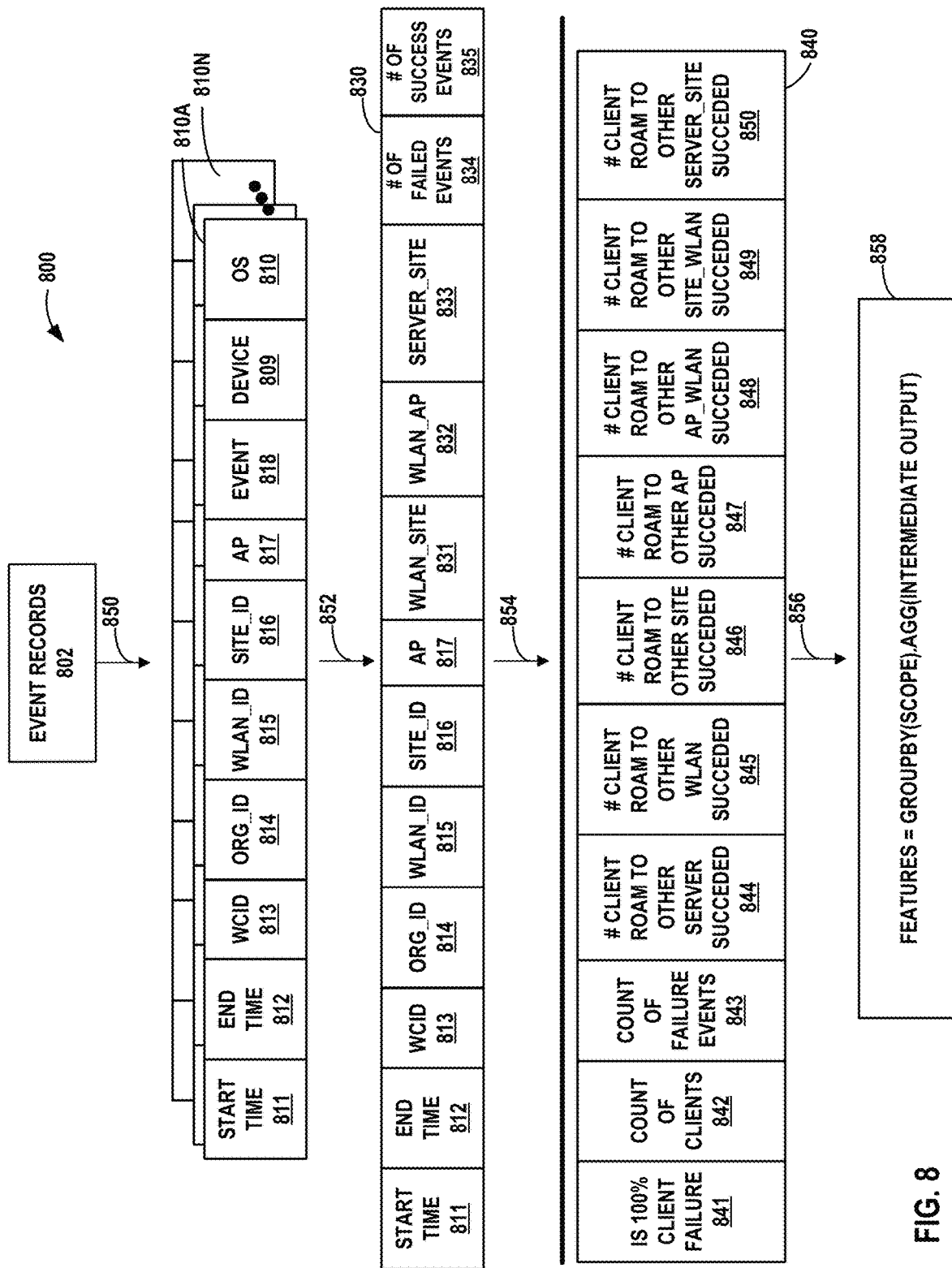
FIG. 8 is an example data modeling process for determining root cause of an error condition through the detection of network scope failures, in accordance with the techniques described in this disclosure.

FIG. 8 is an example data modeling process for determining root cause of error conditions through the detection of network scope failures, in accordance with the techniques described in this disclosure. Data modeling process 800 of FIG. 8 is described with respect to data modeling module 374 of FIG. 3B.

In the example of FIG. 8, data modeling module 374 of network scope detection failure engine 370 may perform data modeling process 800 on event records 802. For example, network scope failure detection engine 370 receives network data 316 and forwards network event data, e.g., event records 802, to data processing module 374 to model the event records 802 for the network scope failure detection process. Optimization module 375 may filter out irrelevant and/or unnecessary events to reduce the number of event records to process (illustrated as element 850 in FIG. 8). For instance, optimization module 375 may filter out neutral events including, but are not limited to, MAC authentication failure, client de-authentication, client authentication denied, gateway spoofing detection, client disassociation, client de-authenticated, HTTP redirect, excessive address resolution protocol messages between client and gateway, and other events that are not used to determine the root cause of failure.

Event records 802 that have filtered out neutral events are illustrated as event records 810A-810N (collectively, "event records 810"). Each of event records 810 may include information including, but is not limited to, start time of the event, end time of the event, detection time, modification time, occurrence, batch count, event name, whether an action is enabled, category, site identifier, organization identifier, entity identifier, entity type, display entity type, detection delay, details of the event, row key, client, event type, severity, event duration, and/or other information associated with the event. In this example, each of event records 810 includes an event start time 811, event end time 812, client identifier (WCID) 813, organization identifier 814, WLAN identifier 815, site identifier 816, AP device identifier 817, type of event 818, server device identifier 819, and/or operating system 820.

In response to filtering out the neutral events, data modeling module 374 may aggregate event records 810 based on one or more group keys (illustrated as element 852 of FIG. 8) to generate an aggregated event record 830. The group keys may be configured from the information described above within event records 810. Although illustrated with a single aggregated event record 830, network data 316 may include a plurality of aggregated event records based on different group keys. The group keys in aggregated event record 830 is one example and may include more or less group keys and/or different group keys based on information in the event records in other examples.

As one example, a client device 148A-1 of FIG. 1A within site 102A may attempt to authenticate with server 128A using AP device 142A-1 at a first time, and may attempt to authenticate with server 128A using AP device 142A-1 at a second time. In this example, data modeling module 374 receives event records 802 including a first event record (e.g., event record 810A) for the first authentication attempt and a second event record (e.g., event record 810N) the second authentication attempt. The first event record and second event record may include information identifying the start time of the first event, the end time of the first event, client device identifier (wireless client identifier (WCID)), organization identifier, WLAN identifier, site identifier, AP device identifier, type of event, server device identifier and/or operating system, respectively. In this example, data modeling module 374 may aggregate the event records based on one or more group keys configured from information of the event records. For example, data modeling module 374 may generate an aggregated event record (e.g., aggregated event record 830) based on all events associated with site 102A, AP device 142A-1, WCID, events occurring within a specific range of time, and/or other common group keys from the first event record and second event record.

Data modeling module 374 may further add to the aggregated event record 830 the associated network scopes such as WLAN_SITE 831, WLAN_AP 832, and/or SERVER_SITE 833. In some examples, data modeling module 374 may include in the aggregated event record 830 the number of failed events 834 (e.g., number of failed event records that were aggregated together) and/or the number of successful events 835 (e.g., number of successful event records that were aggregated together).

Optimization module 374 may then filter out client devices with less than e.g., three (X<3) client device failure network events (illustrated as element 854 in FIG. 8), as described in FIG. 7B above. In some examples, optimization module 374 may filter out attributes (e.g., WLAN+AP) with less than e.g., three client device failure network events. In some examples, optimization module 374 does not filter client successful events for roaming features.

In some examples, network scope failure detection engine 370 may then determine certain information from the aggregated event record 830, such as one or more roaming features including whether there is 100% client failure 841, count of client devices 842, count of failure events 843, number of successful client devices roaming to other servers 844, number of successful client devices roaming to other WLANs 845, number of successful client devices roaming to other sites 846, number of successful client devices roaming to other AP devices 847, number of successful client devices roaming to other AP_WLAN 848, number of successful client devices roaming to other SITE_WLAN 849, and number of successful client devices roaming to other SERVER_SITE 850.

For example, client devices (e.g., client device 148A-1 of FIG. 1A) may roam from one AP device (e.g., AP device 142A-1) to another AP device (e.g., AP device 142A-M) to connect to a server (e.g., server 128A). In one instance, client device 148A-1 may be unable to access server 128A with AP device 142A-1, roam to AP device 142A-2, and successfully connect to server 128A. In this example, network scope failure detection engine 370 may determine the number of successful client devices roaming to other AP devices, such as the example above. In another instance, client device may be unable to access server 128A with AP device 142A-1, roam to AP device 142A-2, and still be unable to access server 128A. In this example, network scope failure detection engine 370 may count the number of failed roaming events, such as the example above.

In response to determining the roaming information from the events of the network data, optimization module 374 may filter out combined attributes (e.g., WLAN+AP attributes) with e.g., greater than or equal to three (X>=3) failure network events (illustrated as element 856 in FIG. 8), as described in FIG. 7B above. In some examples, data modeling process 800 may group the aggregated event records by network scope (e.g., WLAN+AP, AP, WLAN, WLAN+SITE, etc.) to generate features 858 that are used to determine network scope failure.

As one example, a feature is generated for WLAN+AP (e.g., all events aggerated for WLAN+AP) and is evaluated for failure. If WLAN+AP has failure, the WLAN+AP failure is input as a feature for the next network scope (e.g., WLAN+SITE, AP). In this way, as features of a network scope are passed to a network scope of a higher hierarchy level, the number of data needed for evaluating failure is reduced at each network scope level.

As described above, ML models 380 may comprise of different supervised ML models. Each of the supervised ML models may include one or more parameters (e.g., model labels) to detect failure at a particular network scope. For example, a supervised ML model for a particular attribute may include one or more parameters based on one or more information from the aggregated event record. The one or more model labels included in one ML model may be different than the one or more parameters included in another ML model. As one example, a supervised ML model for WLAN (e.g., WLAN attribute 608A of FIG. 6) may include model labels such as a count of clients (e.g., >=X), count of failure events (e.g., >=Y), duration (e.g., >=Z), and roaming (e.g., >=R), where X, Y, Z, and R are based on the distribution of features for each network scope. Because there are typically no labels for the supervised learning model, the X, Y, Z values are used for creating model labels for the purpose of model training. Logistic regression may be the main model that applies. For each scope failure, different logistic regression models may be trained and applied. In this example if network scope failure detection engine 370 determines, based on information in the event records and/or aggregated event record, that the count of clients, count of failure events, duration, and/or roaming model labels have been exceeded, network scope failure detection engine 370 determines that there is a failure at the WLAN network scope, e.g., by generating a severity score (e.g., set a failure label with a value to indicate failure). Network scope failure detection engine 370 may similarly apply an ML model to each network scope, respectively, and evaluate network event data with respect to the network scope to determine whether the network scope has failed.

Figure 9:
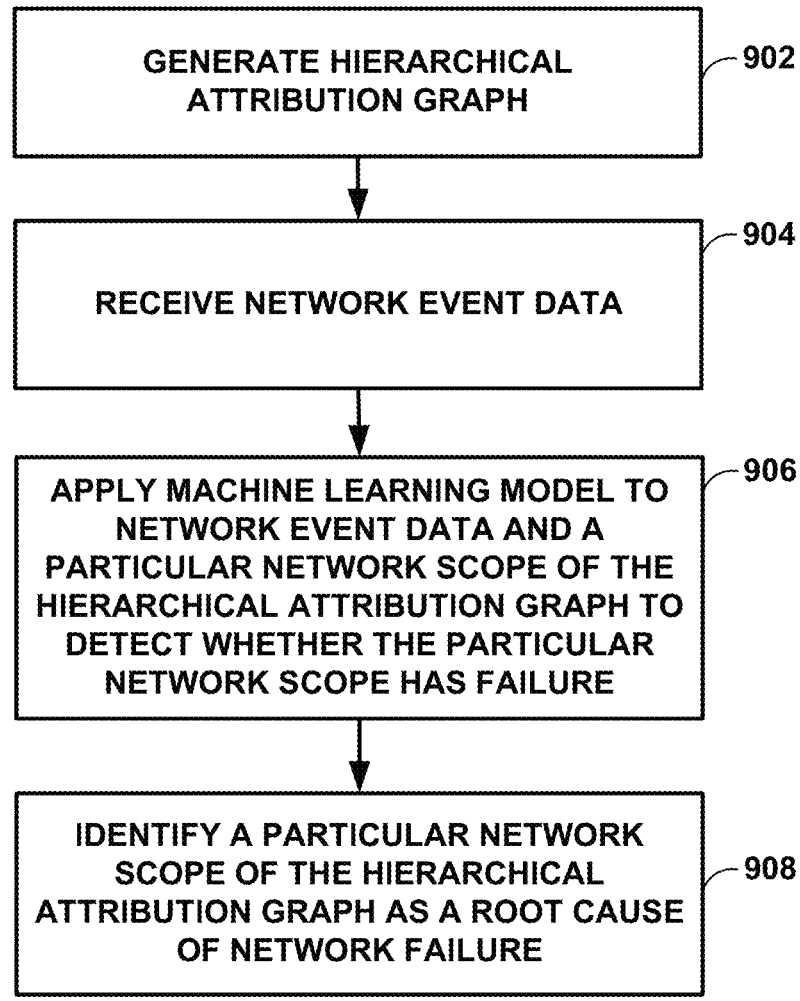
FIG. 9 is a flowchart of an example process by which a network management system determines root cause of an error condition through the detection of network scope failures, in accordance with one or more techniques of the disclosure.

FIG. 9 is a flowchart of an example process by which a network management system determines root cause of an error condition through the detection of network scope failures, in accordance with one or more techniques of the disclosure. FIG. 9 is described with respect to NMS 130 of FIG. 1A and network scope failure detection engine 370 of FIGS. 3A, 3B.

NMS 130 may generate a hierarchical attribution graph (e.g., hierarchical attribution graph 136 of FIG. 1A, hierarchical attribution graph 600 of FIG. 6) (902). As described above, each network scope of network system 100 of FIG. 1 may be represented by an attribute of the hierarchical attribution graph. For example, the network scope of the hierarchical attribution graph may include an organization, one or more servers, one or more sites, one or more wireless networks, one or more AP devices, and/or one or more client devices. The hierarchical attribution graph may include relationships of network scopes of the network such as attribute containment relationships and attribute cross-link relationships.

NMS 130 may receive network event data from AP devices 142 (904). For example, NMS 130 may receive network events indicative of operational behavior of the wireless network, such as successful network events, failure network events, and/or other events. These network events may be received over a plurality of observation time periods. In some examples, optimization module 375 of NMS 130 may optimize event records prior to performing the network scope failure detection process. For example, optimization module 375 may filter out irrelevant and/or unnecessary events (e.g., neutral events) that are not used to determine failure. In some examples, optimization module 375 may additionally, or alternatively, aggregate event records based on one or more group keys from information in event records to reduce the number of event records to process. In some examples, optimization module 375 may additionally, or alternatively, filter out failed clients with less than e.g., three (X<3) failed network events. In some examples, optimization module 375 may additionally, or alternatively, filter out failed WLAN+AP with less than e.g., three (X<3) failed events.

NMS 130 may apply a machine learning model to a particular network scope of the hierarchical attribution graph and the network event data to detect whether the particular network scope has failure (906). For example, network scope failure detection engine 370 may apply different supervised ML models to different network scopes in the hierarchical attribution graph. Each of the supervised ML models may be configured to with one or more parameters (e.g., model labels) to detect failure for a particular network scope. Network scope failure detection engine 370 may compare the network event data associated with one or more client devices with severity score generated from the machine learning model applied to the particular network scope (e.g., based on the model labels) to determine whether to attribute the failure to the particular network scope. For instance, in response to the comparison of the model labels for a count of clients >X, count of failure events >Y, duration >Z, roaming >R, etc., the network scope failure detection engine 370 may generate a severity score (e.g., a failure label set with a value to indicate network scope has or has not failed). The values for each feature can vary and a final score may be generated based on a logistic regression model. In response to determining that the severity score is satisfied (e.g., failure label is set with a value to indicate network scope failure, such as a value of one), network scope failure detection engine 370 may attribute the failure to the particular network scope. Alternatively, in response to determining that the severity score is not satisfied (e.g., one or more of the thresholds for the model labels are not satisfied, such as a value of zero), network scope failure detection engine 370 may not attribute the failure to the particular network scope.

NMS 130 may identify a particular network scope of the hierarchical attribution graph as a root cause of network failure based on a determination that the particular network scope is at the highest hierarchical level that has failure (908). For example, network scope failure detection engine 370 may evaluate the client device network events with respect to a lower network scope hierarchy level of the hierarchical attribution graph (e.g., WLAN+AP) to determine whether to attribute the failure to a higher network scope hierarchy level of the hierarchical attribution graph (e.g., AP or WLAN). For example, if the lower network scope hierarchy level of the hierarchical attribution graph has failed (e.g., there is complete (100%) failure of the entire network scope), network scope failure detection engine 370 may attribute the failure to the higher network scope hierarchy level of the hierarchical attribution graph. If data modeling module 374 attributes the failure to the higher network scope hierarchy level, data modeling module 374 may then evaluate whether the failure should be attributed to the next higher network scope hierarchy level, and so on. As described above, data modeling module 374 of network scope failure detection engine 370 may perform the network scope failure detection process by executing a parallel process of the network event data (e.g., as described in FIG.

7A) and/or by executing a funnel process of the network event data (e.g., as described in FIG. 7B).

The techniques described herein may be implemented using software, hardware and/or a combination of software and hardware. Various examples are directed to apparatus, e.g., mobile nodes, mobile wireless terminals, base stations, e.g., access points, communications system. Various examples are also directed to methods, e.g., method of controlling and/or operating a communications device, e.g., wireless terminals (UEs), base stations, control nodes, access points and/or communications systems. Various examples are also directed to non-transitory machine, e.g., computer, readable medium, e.g., ROM, RAM, CDs, hard discs, etc., which include machine readable instructions for controlling a machine to implement one or more steps of a method.

It is understood that the specific order or hierarchy of steps in the processes disclosed is an example of example approaches. Based upon design preferences, it is understood that the specific order or hierarchy of steps in the processes may be rearranged while remaining within the scope of the present disclosure. The accompanying method claims present elements of the various steps in a sample order and are not meant to be limited to the specific order or hierarchy presented.

In various examples devices and nodes described herein are implemented using one or more modules to perform the steps corresponding to one or more methods, for example, signal generation, transmitting, processing, and/or receiving steps. Thus, in some examples various features are implemented using modules. Such modules may be implemented using software, hardware or a combination of software and hardware. In some examples each module is implemented as an individual circuit with the device or system including a separate circuit for implementing the function corresponding to each described module. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various examples are directed to a machine-readable medium e.g., a non-transitory computer readable medium, including machine executable instructions for causing a machine, e.g., processor and associated hardware, to perform one or more of the steps of the above-described method(s). Some examples are directed to a device including a processor configured to implement one, multiple, or all of the steps of one or more methods of the one example aspect.

In some examples, the processor or processors, e.g., CPUs, of one or more devices, e.g., communications devices such as wireless terminals (UEs), and/or access nodes, are configured to perform the steps of the methods described as being performed by the devices. The configuration of the processor may be achieved by using one or more modules, e.g., software modules, to control processor configuration and/or by including hardware in the processor, e.g., hardware modules, to perform the recited steps and/or control processor configuration. Accordingly, some but not all examples are directed to a communications device, e.g., user equipment, with a processor which includes a module corresponding to each of the steps of the various described methods performed by the device in which the processor is included. In some but not all examples a communications device includes a module corresponding to each of the steps of the various described methods performed by the device in which the processor is included. The modules may be implemented purely in hardware, e.g., as circuits, or may be implemented using software and/or hardware or a combination of software and hardware.

Some examples are directed to a computer program product comprising a computer-readable medium comprising code for causing a computer, or multiple computers, to implement various functions, steps, acts and/or operations, e.g. one or more steps described above. In some examples, the computer program product can, and sometimes does, include different code for each step to be performed. Thus, the computer program product may, and sometimes does, include code for each individual step of a method, e.g., a method of operating a communications device, e.g., a wireless terminal or node. The code may be in the form of machine, e.g., computer, executable instructions stored on a computer-readable medium such as a RAM (Random Access Memory), ROM (Read Only Memory) or other type of storage device. In addition to being directed to a computer program product, some examples are directed to a processor configured to implement one or more of the various functions, steps, acts and/or operations of one or more methods described above. Accordingly, some examples are directed to a processor, e.g., CPU, graphical processing unit (GPU), digital signal processing (DSP) unit, etc., configured to implement some or all of the steps of the methods described herein. The processor may be for use in, e.g., a communications device or other device described in the present application.

Numerous additional variations on the methods and apparatus of the various examples described above will be apparent to those skilled in the art in view of the above description. Such variations are to be considered within the scope of this disclosure. The methods and apparatus may be, and in various examples are, used with BLE, LTE, CDMA, orthogonal frequency division multiplexing (OFDM), and/or various other types of communications techniques which may be used to provide wireless communications links between access nodes and mobile nodes. In some examples the access nodes are implemented as base stations which establish communications links with user equipment devices, e.g., mobile nodes, using OFDM and/or CDMA. In various examples the mobile nodes are implemented as notebook computers, personal data assistants (PDAs), or other portable devices including receiver/transmitter circuits and logic and/or routines, for implementing the methods.

In the detailed description, numerous specific details are set forth in order to provide a thorough understanding of some examples. However, it will be understood by persons of ordinary skill in the art that some examples may be practiced without these specific details. In other instances, well-known methods, procedures, components, units and/or circuits have not been described in detail so as not to obscure the discussion.

Some examples may be used in conjunction with various devices and systems, for example, a User Equipment (UE), a Mobile Device (MD), a wireless station (STA), a wireless terminal (WT), a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some examples may be used in conjunction with devices and/or networks operating in accordance with existing Wireless-Gigabit-Alliance (WGA) specifications (Wireless Gigabit Alliance, Inc. WiGig MAC and PHY Specification Version 1.1, April 2011, Final specification) and/or future versions and/or derivatives thereof, devices and/or networks operating in accordance with existing IEEE 802.11 standards (IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012; IEEE802.11ac-2013 ("IEEE P802.11ac-2013, IEEE Standard for Information Technology—Telecommunications and Information Exchange Between Systems Local and Metropolitan Area Networks—Specific Requirements—Part 11: Wireless LAN Medium Access Control (MAC) and Physical Layer (PHY) Specifications—Amendment 4: Enhancements for Very High Throughput for Operation in Bands below 6 GHz", December, 2013); IEEE 802.11 ad ("IEEE P802.11 ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band", 28 Dec. 2012); IEEE-802.11REVmc ("IEEE 802.11-REVmc™/D3.0, June 2014 draft standard for Information technology—Telecommunications and information exchange between systems Local and metropolitan area networks Specific requirements; Part 11: Wireless LAN Medium Access Control (MAC) and Physical Layer (PHY) Specification"); IEEE802.11-ay (P802.11 ay Standard for Information Technology—Telecommunications and Information Exchange Between Systems Local and Metropolitan Area Networks—Specific Requirements Part 11: Wireless LAN Medium Access Control (MAC) and Physical Layer (PHY) Specifications—Amendment: Enhanced Throughput for Operation in License-Exempt Bands Above 45 GHz)), IEEE 802.11-2016 and/or future versions and/or derivatives thereof, devices and/or networks operating in accordance with existing Wireless Fidelity (Wi-Fi) Alliance (WFA) Peer-to-Peer (P2P) specifications (Wi-Fi P2P technical specification, version 1.5, August 2014) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, or operate using any one or more of the above protocols, and the like.

Some examples may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some examples may be used in conjunction with one or more types of wireless communication signals and/or systems, for example, Radio Frequency (RF), Infra-Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE advanced, Enhanced Data rates for GSM Evolution (EDGE), or the like. Other examples may be used in various other devices, systems and/or networks.

Some demonstrative examples may be used in conjunction with a WLAN (Wireless Local Area Network), e.g., a Wi-Fi network. Other examples may be used in conjunction with any other suitable wireless communication network, for example, a wireless area network, a "piconet", a WPAN, a WVAN, and the like.

Some examples may be used in conjunction with a wireless communication network communicating over a frequency band of 2.4 Ghz, 5 GHz and/or 60 GHz. However, other examples may be implemented utilizing any other suitable wireless communication frequency band(s), for example, an Extremely High Frequency (EHF) band (the millimeter wave (mmWave) frequency band), e.g., a frequency band within the frequency band of between 20 GhH and 300 GHz, a WLAN frequency band, a WPAN frequency band, a frequency band according to the WGA specification, and the like.

While the above provides just some simple examples of the various device configurations, it is to be appreciated that numerous variations and permutations are possible. Moreover, the technology is not limited to any specific channels, but is generally applicable to any frequency range(s)/channel(s). Moreover, and as discussed, the technology may be useful in the unlicensed spectrum.

Although examples are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, a communication system or subsystem, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although examples are not limited in this regard, the terms "plurality" and "a plurality" as used herein may include, for example, "multiple" or "two or more." The terms "plurality" or "a plurality" may be used throughout the specification to describe two or more components, devices, elements, units, parameters, circuits, or the like. For example, "a plurality of stations" may include two or more stations.

It may be advantageous to set forth definitions of certain words and phrases used throughout this document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, interconnected with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, circuitry, firmware or software, or some combination of at least two of the same. It should be noted that the functionality associated with any particular controller may be centralized or distributed, whether locally or remotely. Definitions for certain words and phrases are provided throughout this document and those of ordinary skill in the art should understand that in many, if not most instances, such definitions apply to prior, as well as future uses of such defined words and phrases.

The examples have been described in relation to communications systems, as well as protocols, techniques, means and methods for performing communications, such as in a wireless network, or in general in any communications network operating using any communications protocol(s). Examples of such are home or access networks, wireless home networks, wireless corporate networks, and the like. It should be appreciated however that in general, the systems, methods and techniques disclosed herein will work equally well for other types of communications environments, networks and/or protocols.

For purposes of explanation, numerous details are set forth in order to provide a thorough understanding of the present techniques. It should be appreciated however that the present disclosure may be practiced in a variety of ways beyond the specific details set forth herein. Furthermore, while the examples illustrated herein show various components of the system collocated, it is to be appreciated that the various components of the system can be located at distant portions of a distributed network, such as a communications network, node, within a Domain Master, and/or the Internet, or within a dedicated secured, unsecured, and/or encrypted system and/or within a network operation or management device that is located inside or outside the network. As an example, a Domain Master can also be used to refer to any device, system or module that manages and/or configures or communicates with any one or more aspects of the network or communications environment and/or transceiver(s) and/or stations and/or access point(s) described herein.

Thus, it should be appreciated that the components of the system can be combined into one or more devices, or split between devices, such as a transceiver, an access point, a station, a Domain Master, a network operation or management device, a node or collocated on a particular node of a distributed network, such as a communications network. As will be appreciated from the following description, and for reasons of computational efficiency, the components of the system can be arranged at any location within a distributed network without affecting the operation thereof. For example, the various components can be located in a Domain Master, a node, a domain management device, such as a MIB, a network operation or management device, a transceiver(s), a station, an access point(s), or some combination thereof. Similarly, one or more of the functional portions of the system could be distributed between a transceiver and an associated computing device/system.

Furthermore, it should be appreciated that the various links, including any communications channel(s)/elements/lines connecting the elements, can be wired or wireless links or any combination thereof, or any other known or later developed element(s) capable of supplying and/or communicating data to and from the connected elements. The term module as used herein can refer to any known or later developed hardware, circuitry, software, firmware, or combination thereof, that is capable of performing the functionality associated with that element. The terms determine, calculate, and compute and variations thereof, as used herein are used interchangeable and include any type of methodology, process, technique, mathematical operational or protocol.

Moreover, while some of the examples described herein are directed toward a transmitter portion of a transceiver performing certain functions, or a receiver portion of a transceiver performing certain functions, this disclosure is intended to include corresponding and complementary transmitter-side or receiver-side functionality, respectively, in both the same transceiver and/or another transceiver(s), and vice versa.

The examples are described in relation to enhanced communications. However, it should be appreciated, that in general, the systems and methods herein will work equally well for any type of communication system in any environment utilizing any one or more protocols including wired communications, wireless communications, powerline communications, coaxial cable communications, fiber optic communications, and the like.

The example systems and methods are described in relation to IEEE 802.11 and/or Bluetooth® and/or Bluetooth® Low Energy transceivers and associated communication hardware, software and communication channels. However, to avoid unnecessarily obscuring the present disclosure, the following description omits well-known structures and devices that may be shown in block diagram form or otherwise summarized.

While the above-described flowcharts have been discussed in relation to a particular sequence of events, it should be appreciated that changes to this sequence can occur without materially effecting the operation of the example(s). Additionally, the example techniques illustrated herein are not limited to the specifically illustrated examples but can also be utilized with the other examples and each described feature is individually and separately claimable.

The above-described system can be implemented on a wireless telecommunications device(s)/system, such an IEEE 802.11 transceiver, or the like. Examples of wireless protocols that can be used with this technology include IEEE 802.11a, IEEE 802.11b, IEEE 802.11g, IEEE 802.11n, IEEE 802.11ac, IEEE 802.11ad, IEEE 802.11af, IEEE 802.11ah, IEEE 802.11ai, IEEE 802.11aj, IEEE 802.11aq, IEEE 802.11ax, Wi-Fi, LTE, 4G, Bluetooth®, WirelessHD, WiGig, WiGi, 3GPP, Wireless LAN, WiMAX, DensiFi SIG, Unifi SIG, 3GPP LAA (licensed-assisted access), and the like.

Additionally, the systems, methods and protocols can be implemented to improve one or more of a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a modem, a transmitter/receiver, any comparable means, or the like. In general, any device capable of implementing a state machine that is in turn capable of implementing the methodology illustrated herein can benefit from the various communication methods, protocols and techniques according to the disclosure provided herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, Broadcom® AirForce BCM4704/BCM4703 wireless networking processors, the AR7100 Wireless Network Processing Unit, other industry-equivalent processors, and may perform computational functions using any known or future-developed standard, instruction set, libraries, and/or architecture.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with the examples is dependent on the speed and/or efficiency requirements of the system, the particular function, and the particular software or hardware systems or microprocessor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and telecommunications arts.

Moreover, the disclosed techniques may be readily implemented in software and/or firmware that can be stored on a storage medium to improve the performance of a programmed general-purpose computer with the cooperation of a controller and memory, a special purpose computer, a microprocessor, or the like. In these instances, the systems and methods can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications transceiver.

It is therefore apparent that there have at least been provided systems and methods for enhancing the ability to diagnose and remedy network issues. Many alternatives, modifications and variations would be or are apparent to those of ordinary skill in the applicable arts. Accordingly, this disclosure is intended to embrace all such alternatives, modifications, equivalents and variations that are within the spirit and scope of this disclosure.

What is claimed is:

1. A network management system that manages a plurality of network devices in a network, the network management system comprising:
   one or more processors; and
   memory comprising instructions that when executed by the one or more processors cause the one or more processors to:
   generate a hierarchical attribution graph, wherein the hierarchical attribution graph comprises attributes representing different network scopes at different hierarchical levels;
   receive network event data from the plurality of network devices, wherein the network event data is indicative of operational behavior of the network; and
   attribute, based on a determination that network event data associated with a first network scope in the hierarchical attribution graph satisfies a threshold, a root cause of an issue in the network to a second network scope at a higher hierarchical level in the hierarchical attribution graph than the first network scope.

2. The network management system of claim 1, wherein the hierarchical attribution graph further comprises one or more of a containment relationship representing a first attribute of the attributes included in a second attribute of the attributes or a cross-link relationship representing a third attribute of the attributes having a relation with a fourth attribute of the attributes, wherein the cross-link relationship is represented as a combined attribute.

3. The network management system of claim 2, wherein the combined attribute comprises one or more of: a network attribute representing a particular network combined with a network device attribute representing a particular network device of the particular network, the network attribute combined with a site attribute representing a particular site, or the network device attribute combined with the site attribute.

4. The network management system of claim 1, wherein the second network scope in the hierarchical attribution graph that is attributed to the root cause of the issue in the network is a highest hierarchical level in the hierarchical attribution graph that is determined to have an issue.

5. The network management system of claim 1, wherein to attribute the root cause of the issue in the network to the second network scope, the one or more processors are configured to:
   attribute the root cause of the issue in the network to the second network scope based on a determination that third network scope at a higher hierarchical level in the hierarchical attribution graph than the second network scope does not have an issue.

6. The network management system of claim 1, wherein the one or more processors are further configured to:
not attribute, based on a determination that network event data associated with a third network scope in the hierarchical attribution graph does not satisfy the threshold, the root cause of the issue in the network to a fourth network scope at a higher hierarchical level in the hierarchical attribution graph than the third network scope.

7. The network management system of claim 1, wherein the one or more processors are further configured to:
optimize the network event data by:
filtering neutral events from the network event data; and
aggregating the network event data using a group key configured from information from the network event data to generate an aggregated event record.

8. The network management system of claim 7, wherein the group key comprises one or more of a start time, an end time, a client identifier, an organization identifier, a wireless local area network identifier, a site identifier, or an access point identifier.

9. The network management system of claim 7, wherein the aggregated event record comprises a combined attribute representing cross-link relationships of the attributes within the hierarchical attribution graph.

10. The network management system of claim 7, wherein to optimize the network event data, the one or more processors are further configured to filter out network event data associated with a particular network scope in the hierarchical attribution graph based on determining that network event data associated with the particular network scope comprises less than three failure events.

11. A method comprising:
generating, by one or more processors of a network management system that manages a plurality of network devices in a network, a hierarchical attribution graph, wherein the hierarchical attribution graph comprises attributes representing different network scopes at different hierarchical levels;
receiving, by the network management system, network event data from the plurality of network devices, wherein the network event data is indicative of operational behavior of the network; and
attributing, by the network management system and based on a determination that the network event data of a first network scope in the hierarchical attribution graph satisfies a threshold, a root cause of an issue in the network to a second network scope at a higher hierarchical level in the hierarchical attribution graph than the first network scope.

12. The method of claim 11, wherein the hierarchical attribution graph further comprises one or more of a containment relationship representing a first attribute of the attributes included in a second attribute of the attributes or a cross-link relationship representing a third attribute of the attributes having a relation with a fourth attribute of the attributes, wherein the cross-link relationship is represented as a combined attribute.

13. The method of claim 12, wherein the combined attribute comprises one or more of: a network attribute representing a particular network combined with a network device attribute representing a particular network device of the particular network, the network attribute combined with a site attribute representing a particular site, or the network device attribute combined with the site attribute.

14. The method of claim 11, wherein the second network scope in the hierarchical attribution graph that is attributed to the root cause of the issue in the network is a highest hierarchical level that is determined to have an issue.

15. The method of claim 11, wherein attributing the root cause of the issue in the network to the second network scope in the hierarchical attribution graph comprises:
attributing the root cause of the issue in the network to the second network scope in the hierarchical attribution graph based on determining that a third network scope at a higher hierarchical level in the hierarchical attribution graph than the second network scope does not have an issue.

16. The method of claim 11, the method further comprising:
not attributing, based on determining that a third network scope in the hierarchical attribution graph does not satisfy the threshold, the root cause of the issue in the network to a fourth network scope at a higher hierarchical level in the hierarchical attribution graph than the third network scope.

17. The method of claim 11, further comprising:
assigning a priority value to the issue in the network, wherein the priority value is based on a number of client devices within the network affected by the issue in the network.

18. Non-transitory computer-readable storage media comprising instructions that, when executed, configure processing circuitry to:
generate a hierarchical attribution graph, wherein the hierarchical attribution graph comprises attributes representing different network scopes at different hierarchical levels;
receive network event data from a plurality of network devices within a network, wherein the network event data is indicative of operational behavior of the network; and
attribute, based on a determination that the network event data associated with a first network scope in the hierarchical attribution graph satisfies a threshold, a root cause of an issue in the network to a second network scope at a higher hierarchical level in the hierarchical attribution graph than the first network scope.

* * * * *